US012692363B2

(12) United States Patent
Sirkar et al.

(10) Patent No.: US 12,692,363 B2
(45) Date of Patent: Jul. 28, 2026

---

(54) PROTECTIVE MATERIAL AND ASSOCIATED PROTECTIVE WEAR

(71) Applicants: New Jersey Institute of Technology, Newark, NJ (US); U.S. Army Combat Capabilities Development Command, Chemical Biological Center, Aberdeen Proving Ground, MD (US)

(72) Inventors: Kamalesh Sirkar, Bridgewater, NJ (US); Zafar Iqbal, Morris Plains, NJ (US); Yufeng Song, Newark, NJ (US); Gregory Peterson, Bel Air, MD (US); Cheng Peng, Huntington Beach, CA (US)

(73) Assignees: New Jersey Institute of Technology, Newark, NJ (US); The United States of America, as represented by the Secretary of the Army, Washington, DC (US)

( * ) Notice: Subject to any disclaimer, the term of this patent is extended or adjusted under 35 U.S.C. 154(b) by 335 days.

(21) Appl. No.: 18/196,046

(22) Filed: May 11, 2023

(65) Prior Publication Data

US 2025/0215190 A1     Jul. 3, 2025

Related U.S. Application Data

(60) Provisional application No. 63/341,058, filed on May 12, 2022.

(51) Int. Cl.
C08K 3/20 (2006.01)
C08J 5/18 (2006.01)

(52) U.S. Cl.
CPC ..................................... C08K 3/20 (2013.01); C08J 5/18 (2013.01); C08J 2327/18 (2013.01)

(58) Field of Classification Search
None
See application file for complete search history.

(56) References Cited

U.S. PATENT DOCUMENTS

| | | | | |
|---|---|---|---|---|
| 11,097,261 | B1 * | 8/2021 | Landers | B01J 35/615 |
| 2011/0189452 | A1 * | 8/2011 | Lettow | C01B 32/225 |
| | | | | 977/734 |
| 2018/0207613 | A1 * | 7/2018 | Böhringer | C09J 7/38 |

(Continued)

OTHER PUBLICATIONS

Bui, N.; Meshot, E. R.; Kim, S.; Peña, J.; Gibson, P. W.; Wu, K. J.; Fornasiero, F. Ultrabreathable and protective membranes with sub-5 nm carbon nanotube pores. Advanced Materials. 2016, 28, 5871-5877.

(Continued)

*Primary Examiner* — Chinessa T. Golden
(74) *Attorney, Agent, or Firm* — McCarter & English, LLP

(57) ABSTRACT

An example protective material formed from a multilayered laminate is provided. The protective material includes a first layer including a microporous membrane supporting a material. The protective material includes a second layer positioned adjacent to the first layer. The second layer includes porous membrane supporting a bed of a metal organic framework (MOF). The combination of the first and second layers provides a barrier against toxic vapors/gases, while allowing for moisture transmission, resulting in protection and comfort to the user.

20 Claims, 24 Drawing Sheets

(56)                References Cited

U.S. PATENT DOCUMENTS

| | | | | |
|---|---|---|---|---|
| 2019/0308141 | A1* | 10/2019 | Poole | B01D 69/02 |
| 2020/0061403 | A1* | 2/2020 | Böhringer | B32B 5/20 |
| 2020/0239617 | A1* | 7/2020 | Al Hamouz | B01D 53/02 |
| 2020/0384422 | A1* | 12/2020 | Liu | B01D 69/105 |
| 2022/0032240 | A1* | 2/2022 | Fokema | B01D 69/12 |

OTHER PUBLICATIONS

Cavka, J. H.; Søren J.; Unni O.; Nathalie G.; Carlo L.; Silvia B.; Karl P. L. A new zirconium inorganic building brick forming metal organic frameworks with exceptional stability. J. Am. Chem. Soc. 2008, 130, 13850-13851.

Chen, P-Y.; Zhang, M.; Liu, M.; Wong, I. Y.; Hurt, R. H. Ultrastretchable graphene-based molecular barriers for chemical protection, detection, and actuation. ACS Nano. 2018, 12, 234-244.

Eliseev, A. A. et al., Operando study of water vapor transport through ultra-thin graphene oxide membranes, 2D Mater. 2019, 6, 035039.

Eum, K.; Ma, C.; Rownaghi, A.; Jones, C. W.; Nair, S. ZIF-8 Membranes via interfacial microfluidic processing in polymeric hollow fibers: Efficient propylene separation at elevated pressures. ACS Appl. Mater. Interfaces. 2016, 8, 25337-25342.

Jasuja, H. et al., Evaluation of MOFs for air purification and air quality control applications: Ammonia removal from air, Chem. Eng. Sci. 2015, 124, 118-124.

Kandiah, M. et al., Synthesis and stability of tagged UiO-66 Zr-MOFs, Chem. of Mater. 2010, 22, 6632?6640.

Kovvali, A. S. et al., Dendrimer membranes: A CO2-selective molecular gate, J. Am. Chem. Soc. 2000, 122, 7594?7595.

Kuila, T. et al., Facile method for the preparation of water dispersible graphene using sulfonated poly (ether-ether-ketone) and its application as energy storage materials, Langmuir. 2012, 28, 9825?9833.

Lin, J. Y. Molecular sieves for gas separation. Science. 2016, 353, 121-122.

Lin, Y. S. Metal organic framework membranes for separation applications. Curr. Opin. Chem. Eng. 2015, 8, 21-28.

Lomax, G. R. Breathable polyurethane membranes for textile and related industries. J. Mater. Chem. 2007, 17, 2775-2784.

Nair, R. R. et al., Unimpeded permeation of water through helium-leak-tight graphene-based membranes, Science. 2012, 335, 442? 444.

Peng, C. et al., Graphene oxide-based membrane as protective barrier against toxic vapors and gases, ACS Appl. Mater. Interfaces. 2020, 12, 11094-11103.

Peterson, G. W. et al., Engineering UiO-66-NH2 for toxic gas removal, Ind. Eng. Chem. Res. 2014, 53, 701-707.

Peterson, G. W. et al., Flexible SIS/HKUST-1 Mixed matrix composites as protective barriers against chemical warfare agent simulants, ACS Appl. Mater. Interfaces. 2018, 10, 43080-43087.

Peterson, G. W. et al., Tuning the Morphology and activity of Electrospun polystyrene/UiO-66-NH2 metal?organic framework composites to enhance chemical warfare agent removal, ACS Appl. Mater. Interfaces, 2017, 9, 32248-32254.

Petukhov, D. I.; Chernovaa, E. A. ; Kapitanovab, O. O.; Boytsovaa, O. V.; Valeev, R. G.; Chumakove, A. P.; Konovalove, O. V.; Eliseev, A. A. Thin graphene oxide membranes for gas dehumidification. J. Membrane Sci. 2019, 577, 184-194.

Rieth, A. J. et al., Controlled Gas Uptake in Metal-Organic Frameworks with Record Ammonia Sorption, J. Am. Chem. Soc. 2018, 140, 3461-3466.

Rieth, A. J. et al., Programming framework materials for ammonia capture, ACS Cent. Sci., 2018, 4, 666-667.

Song, Y. et al., Membrane-supported metal organic framework based nanopacked bed for protection against toxic vapors, Separation and Purification Technology. 2020, 251, 117406.

Steinberg, R. S. et al., Breathable Vapor Toxicant Barriers Based on Multilayer Graphene Oxide, ACS Nano. 2017, 11, 5670-5679.

Y. Li, et al., Autonomously responsive membranes for chemical warfare protection, Advanced Functional Materials. 2020, 30, 2000258.

Zhao, Z. et al., Gas separation properties of metal organic framework (MOF-5) membranes, Ind. Eng. Chem. Res. 2012, 52, 1102-1108.

* cited by examiner

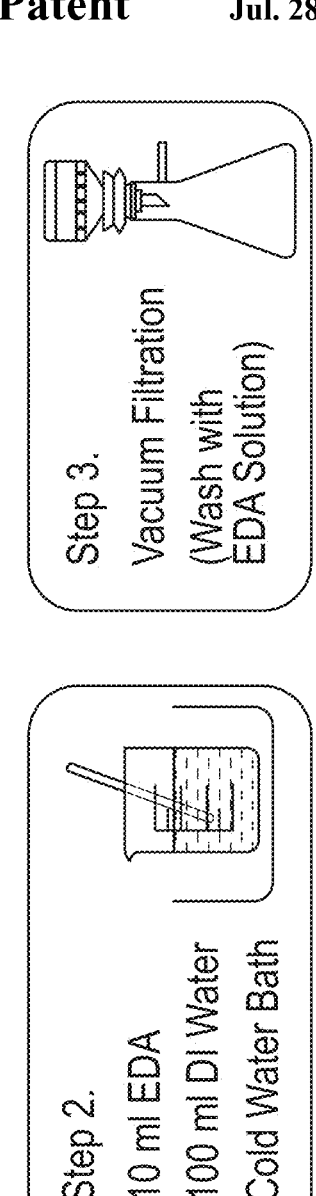
Step 3.
Vacuum Filtration
(Wash with
EDA Solution)
FIG. 2C
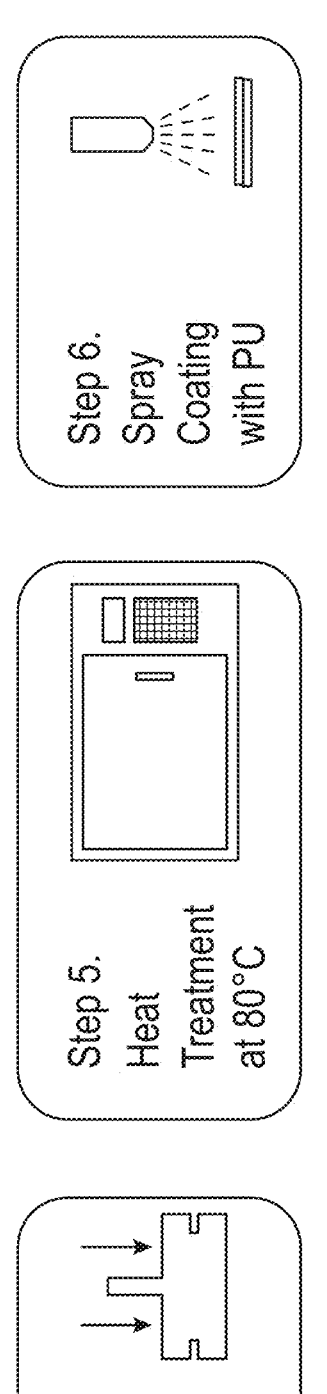
Step 6.
Spray
Coating
with PU
FIG. 2F
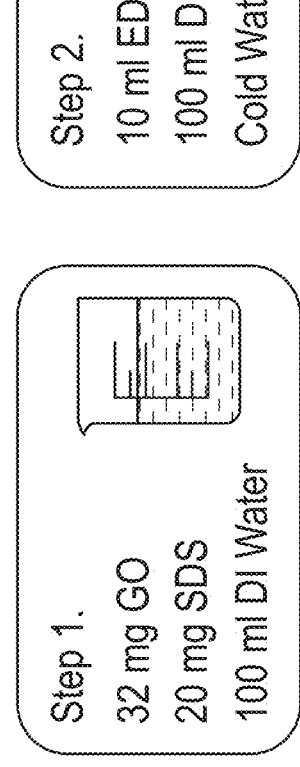
Step 2.
10 ml EDA
100 ml DI Water
Cold Water Bath
FIG. 2B
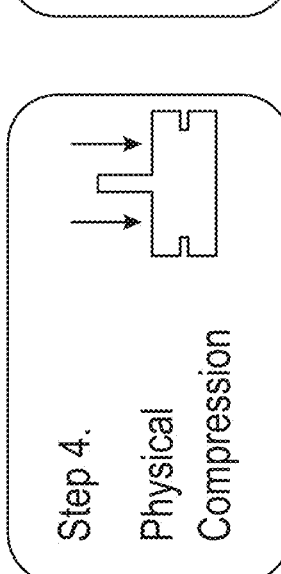
Step 5.
Heat
Treatment
at 80°C
FIG. 2E
Step 1.
32 mg GO
20 mg SDS
100 ml DI Water
FIG. 2A
Step 4.
Physical
Compression
FIG. 2D

Laser-induced Graphene

Porous PES Membrane Substrate

GO Flakes with EDA Crossinglingking

Membrane Pores as Nanopacked Bed

Sorptive/Reactive Nanostuctured UiO-66-NH₂ MOFs

PROTECTIVE MATERIAL AND ASSOCIATED PROTECTIVE WEAR

CROSS-REFERENCE TO RELATED APPLICATIONS

This application claims the benefit of a commonly assigned U.S. Provisional Patent Application No. 63/341,058, which was filed on May 12, 2022. The entire content of the foregoing provisional application is incorporated herein by reference.

STATEMENT OF GOVERNMENT SUPPORT

The invention was made with government support under grant number HDTRA1-16-1-0028 awarded by the Defense Threat Reduction Agency (DTRA). The government has certain rights in the invention.

BACKGROUND

Protective suits or garments are used in a variety of industries, particularly in industries involving chemical agents. Such industries can include those involving hazardous duties, clean-up of industrial accidents, and defense applications where toxic gases and vapors have been released. The goal of protective garments is to rapidly pass water vapor and block threats from vapors of chemical warfare agents (CWAs) and toxic gases/vapors over an extended period of time. Some examples of CWAs can include sulfur mustard (HD), nerve agent Soman (GD), or the like. One example of a CWA simulant can include dimethyl methyl phosphonate (DMMP). One example of a toxic species in a gas phase can include ammonia.

A variety of materials, material structures and membranes have been studied for their barrier properties in blocking toxic gases and vapors, including breathability of such materials. (See, e.g., Nagarajan, R. et al., S. *Nanoscience and Nanotechnology for Chemical and Biological Defense*; ACS Symposium Series; American Chemical Society, 2009, Vol. 1016; Romano, J. A. et al., Chemical Warfare Agents: Chemistry, Pharmacology, Toxicology, and Therapeutics; CRC Press, 2007, pp 21-50; Napadensky, E. et al., *Breathability and Selectivity of Selected Materials for Protective Clothing*, No. ARL-TR-3235; Army Research Lab Aberdeen Proving Ground MD Weapons and Materials Research Directorate, 2004; Wartell, M. A. et al., *Strategies to Protect the Health of Deployed U.S. Forces: Force Protection and Decontamination*, National Academy Press, Washington, D.C., 1999; Lomax, G. R., *Breathable polyurethane membranes for textile and related industries*, J. Mater. Chem. 2007, 17, 2775-2784; Rother, M. et al., *Self-Sealing and Puncture Resistant Breathable Membranes for Water-Evaporation Applications*, Adv. Mater. 2015, 27, 6620-6624; *Approval of Respiratory Protective Devices*, Code of Federal Regulations, Part 84, Title 42, 1995). Traditional protective suits may include a large amount of active carbon to assist with blocking of toxic vapors. However, addition of large amounts of active carbon in such suits may result in the suit being heavy and uncomfortable for the user. To achieve a lighter suit, some traditional suits have used a thick film of butyl rubber to assist with blocking of toxic vapors. However, the moisture transmission characteristics of butyl rubber are poor, also resulting in discomfort to the user. In some instances, a porous membrane-supported layer of graphene oxide (GO) laminate appropriately cross-linked may have been used to block toxic agents for a short period of time only. However, the rate of transmission of such toxic agents after the short period of time is drastically reduced (See, e.g., Peng et al., ACS Applied Materials & Interfaces, vol. 12, 11094 (2020)) by as much as 98% of the feed mixture such that the gas stream permeating has a very low level of CWAs. In some instances, the GO laminate may provide a reasonable level of moisture vapor transmission rate.

Other traditional membrane-based barriers generally show similar behavior (See, e.g., Li et al., Adv. Funct. Mater. 2020, 30, 2000258) of around 98% rejection of toxic vapors with a reasonable moisture transmission rate. If thick rubbers (such as butyl rubber) are used to block toxic vapors and CWAs for an extended period and the protective material includes metal organic framework (MOF) crystals having high moisture sorption, the moisture transport rates would still be unacceptably low (See, e.g., Peterson et al., ACS Appl. Mater. Interfaces, 10, 43080 (2018)). A thin layer of MOF nanocrystals supported in the pores of a submicron pore size membrane as a nanopacked bed may have improved sorption capabilities for CWAs. Although such layer of MOF nanocrystals may provide a high moisture transmission rate, it cannot block CWAs for extended periods of time.

Recently there has been an increasing focus on MOFs for removing toxic gases by adsorption and destruction. Independent sorption and breakthrough studies of $NH_3$ and CNCI through a packed bed of pellets of MOF UiO-66-$NH_2$ were implemented in a micro-breakthrough and regular test-tube packed beds set-up under dry and humid conditions. (See, e.g., Peterson, G. W. et al., *Engineering UiO-66-$NH_2$ for toxic gas removal*, Ind. Eng. Chem. Res. 2014, 53, 701-707). Ammonia sorption and breakthrough studies for various functionalized variations of Zr-based MOF UiO-66 (UIO-66-OH, UIO-66-$(OH)_2$, UiO-66-$NO_2$, UIO-66-$NH_2$, UiO-66-$SO_3H$, and UiO-66-$(COOH)_2$) in a packed bed were carried out with dry and humid air. (See, e.g., Jasuja, H. et al., *Evaluation of MOFs for air purification and air quality control applications: Ammonia removal from air*, Chem. Eng. Sci. 2015, 124, 118-124). High $NH_3$ capture/storage capacity was demonstrated by modifying the surface of pores in covalent organic networks (CONs). (See, e.g., Ricth, A. J. et al., *Controlled Gas Uptake in Metal-Organic Frameworks with Record Ammonia Sorption*, J. Am. Chem. Soc. 2018, 140, 3461-3466; Rieth, A. J. et al., *Programming framework materials for ammonia capture*, ACS Cent. Sci., 2018, 4. 666-667).

Other formats for using MOFs in barriers/suits have been studied for protection against CWAs. Electrospun nanofibers of polystyrene containing MOF UiO-66-$NH_2$ was studied to remove $Cl_2$ and the nerve agent Soman. (See, e.g., Peterson, G. W. et al., *Tuning the Morphology and activity of Electrospun polystyrene/UiO-66-$NH_2$ metal-organic framework composites to enhance chemical warfare agent removal*, ACS Appl. Mater. Interfaces, 2017, 9, 32248-32254). Layers of pure MOF as a membrane or mixed matrix membranes (MMMs) having MOFs dispersed in a polymer have been studied for a variety of separations. (See, e.g., Eum, K. et al., *ZIF-8 Membranes via interfacial microfluidic processing in polymeric hollow fibers: Efficient propylene separation at elevated pressures*, ACS Appl. Mater. Interfaces. 2016, 8, 25337-25342; Zhao, Z. et al., *Gas separation properties of metal organic framework (MOF-5) membranes*, Ind. Eng. Chem. Res. 2012, 52, 1102-1108; Lin, Y. S., *Metal organic framework membranes for separation applications*, Curr. Opin. Chem. Eng. 2015, 8, 21-28; Lin, J. Y., *Molecular sieves for gas separation*, Science. 2016, 353, 121-122). Such membranes are usually thin and prepared for steady-state gas separations, and typically cannot completely block a selected gas/vapor species. This is true even when a gas separation membrane has a high selectivity of 15,000-18,000. (See, e.g., Kovvali, A. S. et al., *Dendrimer membranes: A CO_2-selective molecular gate*, J. Am. Chem. Soc. 2000, 122, 7594-7595). A much thicker membrane (20 mil) with a high loading (50%) of the MOF HKUST-1 in an elastomeric triblock copolymer was found to have a high permeation lag time: the breakthrough time for CEES feed concentration was high, ~4000 min. (See, e.g., Peterson, G. W. et al., *Flexible SIS/HKUST-1 Mixed matrix composites as protective barriers against chemical warfare agent simulants*, ACS Appl. Mater. Interfaces. 2018, 10, 43080-43087). The moisture vapor transmission rate (MVTR) was however low, about 192 $g/m^2$-day (with a required minimum of about 2000 $g/m^2$-day). (See, e.g., Bui, N. et al., *Ultrabreathable and protective membranes with sub-5 nm carbon nanotube pores*, Advanced Materials. 2016, 28, 5871-5877). Extended duration CWA blockage is needed along with high MVTR values.

An alternative to the MMM concept employs a membrane-based strategy involving a serial membrane structure using carbon nanotubes (CNTs). Using a highly breathable CNT-membrane providing an effective barrier against biological agents as a base (See, e.g., Bui, N. et al., Ultrabreathable and protective membranes with sub-5 nm carbon nanotube pores, Advanced Materials. 2016, 28, 5871-5877)., a layer of polymer chains was grown on the top surface of the CNTs. The polymer chains reversibly collapsed in contact with a CWA threat, thus temporarily shutting CNT pore mouths and drastically reducing the permeation rate of nerve agent simulant across the membrane. (See, e.g., Y. Li, et al., *Autonomously responsive membranes for chemical warfare protection*, Advanced Functional Materials. 2020, 30, 2000258). The nerve agent simulant was diethyl chlorophosphate (DCP), and experiments showed that DCP permeation was restricted to ≈1% of the chemical challenge. Complete blockage of the nerve agent simulant for an extended period of time was not achieved.

Therefore, blockage of toxic gases/vapors with traditional materials results in a compromise of water vapor transmission capabilities, and vice versa. As such, there is an imbalance between materials that allow the protective suit to block threats from toxic vapors for an extended period of time, while simultaneously providing comfortable transmission of water vapors.

SUMMARY

Embodiments of the present disclosure provide an exemplary protective material and associated protective wear (e.g., a suit, garment, or the like) fabricated from such protective material. The protective material can be a flexible, moisture-permeable barrier membrane to block toxic vapors and/or chemicals. The protective material is effective in blocking toxic vapors and CWAs for extended periods of time, while allowing for improved moisture transmission characteristics. The protective material therefore provides protection for extended periods of time without compromising water vapor transmission capabilities (e.g., breathability), and providing flexibility based on a thin structure. The protective suit/garment fabricated from such protective material therefore provides improves chemical protection to the individual, while being lightweight and comfortable for the individual during use.

The protective material includes a multilayer structure. The multilayer structure includes a microporous membrane (e.g., a first or top layer) supporting a cross-linked graphene oxide (GO) laminate. The first layer faces the feed gas and is placed over the second layer. In particular, below or immediately adjacent to the first layer is a second layer (e.g., a bottom layer) in the form of a porous membrane supported nanopacked bed of a suitable metal organic framework (MOF). The GO laminate layer completely blocks CWAs for a short period of time and, during the subsequent extended period of time, allows a low value of a rate of permeation of the CWAs and toxic agents through the GO laminate layer. The MOF nanopacked bed layer can adsorb the low value of the permeation of CWAs for an extended period of time. In some embodiments, instead of a GO laminate layer, a MXene laminate layer can be used. In some embodiments, instead of UiO-66-$NH_2$ as the MOF, other types of MOFs can be used. In some embodiments, bonding between the GO and a porous polymeric substrate can be achieved via glutaraldehyde-based or amine-based crosslinking. In some embodiments, the GO laminate layer supported on a porous polymer film can be flipped by about 180° such that the porous polymer support faces the feed gas. In such instances, the surface of the GO layer is supported by the porous membrane-supported nanopacked bed of a suitable MOF. Bonding between the bottom surface of the inverted GO layer and the top surface of the porous membrane supporting the nanopacked bed of MOFs can be implemented via crosslinking using glutaraldehyde or amines, since the GO surface includes many functional groups (such as —OH or the like) at the edges.

The net result is that toxic agents, CWAs, and similar fluids are completely blocked for an extended period of time, even though the moisture transmission rate is acceptable. As an example, experimentation has indicated that the exemplary multilayer barrier structure blocked $NH_3$ completely for 2,750 minutes, blocked HD completely for 1,075 minutes, blocked GD and a nerve agent simulant completely for 176 minutes, and blocked DMMP completely for 7 days. The protective material can therefore be used in a variety of industries, e.g., protective garments, protective gloves, protective suits, or the like, where a gas and/or vapor species is to be completely blocked for an extended period of time. In some embodiments, the material can be used for fabrication for one or more layers of a packaging cover to prevent infiltration of toxic chemicals in or out of the package.

In accordance with embodiments of the present disclosure, an exemplary protective material is provided. The protective material includes a first layer including a microporous membrane supporting a material (e.g., a cross-linked material). The protective material includes a second layer positioned adjacent to the first layer. The second layer includes porous membrane supporting a bed (e.g., a nanopacked bed) of a metal organic framework (MOF). In some embodiments, the second layer can include other suitable sorbents and/or absorbents.

The first layer and the second layer are secured or bonded to each other along an entire overlapping surface area of the respective first and second layers. The first and second layers can be flexible. The first layer is configured as an outermost layer of the protective material and is intended to face a feed gas before the second layer faces the feed gas. The first layer is configured to block (e.g., completely, substantially completely, or below detectable limits) chemical warfare agents (CWAs) for a first period of time, and during a second period of time immediately beyond the first of time, the first layer allows a low-level rate of permeation of the CWAs through the first layer and to the second layer. The second layer at least one of absorbs or adsorbs the low-level rate of permeation of the CWAs for the second period of time to prevent passage of the CWAs through the second layer during the second period of time. In some embodiments, the second layer can react and/or detoxify the low-level rate of permeation of the CWAs for the second period of time to prevent passage of the CWAs through the second layer during the second period of time.

In some embodiments, the first and second periods of time can depend on, e.g., the kinetic diameter of the molecule. For example, for smaller gaseous molecules (e.g., ammonia, or the like), the first period of time may be about, e.g., 8-13 minutes inclusive, 8-12 minutes inclusive, 8-11 minutes inclusive, 8-10 minutes inclusive, 8-9 minutes inclusive, 9-13 minutes inclusive, 10-13 minutes inclusive, 11-13 minutes inclusive, 12-13 minutes inclusive, 8 minutes, 9 minutes, 10 minutes, 11 minutes, 12 minutes, 13 minutes, or the like. For larger vapor molecules (e.g., toluene, DMMP, or the like), the first period of time may be between about, e.g., 4-15 days inclusive, 4-14 days inclusive, 4-13 days inclusive, 4-12 days inclusive, 4-11 days inclusive, 4-10 days inclusive, 4-9 days inclusive, 4-8 days inclusive, 4-7 days inclusive, 4-6 days inclusive, 4-5 days inclusive, 5-14 days inclusive, 6-14 days inclusive, 7-14 days inclusive, 8-14 days inclusive, 9-14 days inclusive, 10-14 days inclusive, 11-14 days inclusive, 12-14 days inclusive, 13-14 days inclusive, 4 days, 5 days, 6 days, 7 days, 8 days, 9 days, 10 days, 11 days, 12 days, 13 days, 14 days, or the like.

In some embodiments, the second period of time can depend on the concentration, kinetic diameter, and/or sorption properties of the molecule. In some embodiments, the second period of time can be between about, e.g., 1,060-2,500 minutes inclusive, 1,060-2,400 minutes inclusive, 1,060-2,300 minutes inclusive, 1,060-2,200 minutes inclusive, 1,060-2,100 minutes inclusive, 1,060-2,000 minutes inclusive, 1,060-1,900 minutes inclusive, 1,060-1,800 minutes inclusive, 1,060-1,700 minutes inclusive, 1,060-1,600 minutes inclusive, 1,060-1,500 minutes inclusive, 1,060-1,400 minutes inclusive, 1,060-1,300 minutes inclusive, 1,060-1,200 minutes inclusive, 1,060-1,100 minutes inclusive, 1,100-2,500 minutes inclusive, 1,200-2,500 minutes inclusive, 1,300-2,500 minutes inclusive, 1,400-2,500 minutes inclusive, 1,500-2,500 minutes inclusive, 1,600-2,500 minutes inclusive, 1,700-2,500 minutes inclusive, 1,800-2,500 minutes inclusive, 1,900-2,500 minutes inclusive, 2,000-2,500 minutes inclusive, 2,100-2,500 minutes inclusive, 2,200-2,500 minutes inclusive, 2,300-2,500 minutes inclusive, 2,400-2,500 minutes inclusive, 1,060 minutes, 1,100 minutes, 1,200 minutes, 1,300 minutes, 1,400 minutes, 1,500 minutes, 1,600 minutes, 1,700 minutes, 1,800 minutes, 1,900 minutes, 2,000 minutes, 2,100 minutes, 2,200 minutes, 2,300 minutes, 2,400 minutes, 2,500 minutes, or the like. In some embodiments, the second period of time can be about 2,500 minutes for ammonia, and about 1,060 minutes for HD.

The first layer is impermeable to small gases at zero relative humidity (RH) and allows $H_2O$ vapor to pass therethrough. In some embodiments, the cross-linked material of the first layer can be a graphene oxide (GO). In some embodiments, the cross-linked material of the first layer can be a MXene laminate. In some embodiments, the microporous membrane (e.g., the microporous support membrane) of the first layer can be fabricated from polyethersulfone (PES), polyetheretherketone (PEEK), polyurethane (PU), cross-linked polyvinyl alcohol, polyether block amide (PEBA), or surface-treated polyamide. In some embodiments, any type of suitable material can be used for the microporous membrane of the first layer so long as sufficient bonding is achieved between the GO layer and the porous substrate.

In some embodiments, the metal organic framework (MOF) of the second layer can be sorptive or reactive nanostructured UiO-66-NH$_2$. In some embodiments, other types of MOF can be used for the second layer. In some embodiments, the microporous membrane can be bonded to the cross-linked material by glutaraldehyde-based crosslinking. The first and second layers allow transmission of moisture therethrough at a rate of at least 1,500 g/m$^2$ per day at 30° C. and a relative humidity difference of 50%. In some embodiments, the moisture transmission rate per day at 30° C. and a relative humidity difference of 50% can be about, e.g., 1,500-2,000 g/m$^2$ inclusive, 1,500-1,900 g/m$^2$ inclusive, 1,500-1,800 g/m$^2$ inclusive, 1,500-1,700 g/m$^2$ inclusive, 1,500-1,600 g/m$^2$ inclusive, 1,600-2,000 g/m$^2$ inclusive, 1,700-2,000 g/m$^2$ inclusive, 1,800-2,000 g/m$^2$ inclusive, 1,900-2,000 g/m$^2$ inclusive, 1,500 g/m$^2$, 1,600 g/m$^2$, 1,700 g/m$^2$, 1,800 g/m$^2$, 1,900 g/m$^2$, 2,000 g/m$^2$, or the like.

In some embodiments, a combination of the first and second layers can be configured to completely block NH$_3$ for about 2,750 minutes. In some embodiments, a combination of the first and second layers can be configured to completely block sulfur mustard gas (HD) for about 1,075 minutes. In some embodiments, a combination of the first and second layers can be configured to completely block Soman gas (GD) and a nerve simulant for about 176 minutes. In some embodiments, a combination of the first and second layers can be configured to completely block (dimethyl methyl phosphonate) DMMP for about 7 days.

In accordance with embodiments of the present disclosure, an exemplary protective wear fabricated from the protective material discussed herein is provided. In accordance with embodiments of the present disclosure, an exemplary protective packaging or cover for one or more items fabricated from the protective material discussed herein is provided.

In accordance with embodiments of the present disclosure, an exemplary method of fabricating a protective material is provided. The method can include providing a first layer including a microporous membrane supporting a cross-linked material. The method can include securing or bonding a second layer to the first layer. The second layer includes porous membrane supporting a nanopacked bed of a metal organic framework (MOF).

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the protective material and associated protective wear, reference is made to the accompanying figures, wherein:

FIGS. 2A-2F illustrate steps of fabricating a top layer of an exemplary protective material in accordance with the present disclosure;

DETAILED DESCRIPTION

Figures 1A, 1B:
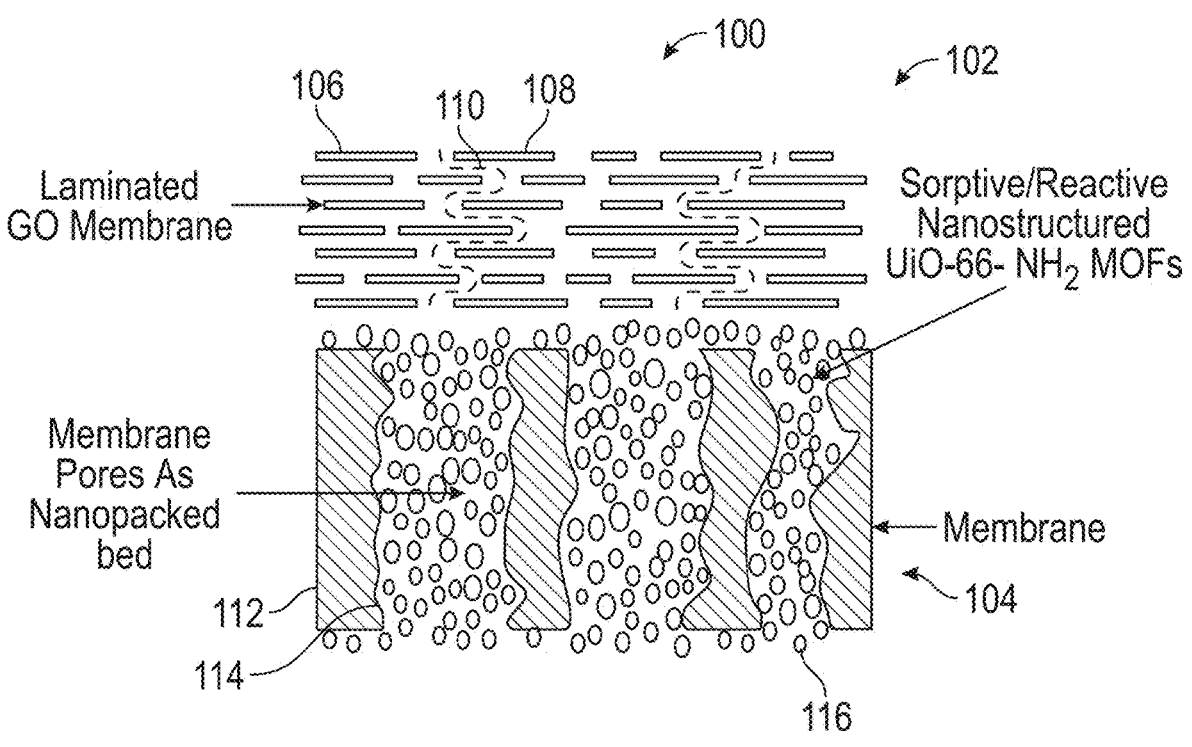
FIG. 1A is a diagrammatic cross-sectional view of an exemplary protective material in accordance with the present disclosure.
FIG. 1B is a chart illustrating an individual permeation behavior of each layer of an exemplary protective material in accordance with the present disclosure.

Embodiments of the present disclosure provide an exemplary protective material, associated protective wear (e.g., a suit, garment, or the like) fabricated from such protective material, and covers and/or packaging fabricated from such protective material. The material protects against chemical warfare agents (CWAs) and/or accidentally released toxic chemicals by blocking transport and transmission of toxic gases/vapors for a substantial period of time while allowing moisture transport for breathability. The material therefore satisfies both the protective aspect against chemical agents/vapors, while simultaneously providing breathability and flexibility.

The exemplary material can include a multilayered membrane-based flexible barrier: a graphene oxide (GO) laminate-based membrane over a metal-organic framework (MOF) nanocrystal-filled expanded polytetrafluorethylene (ePTFE) membrane having submicrometer pores. The GO laminate-based layer develops a steady breakthrough concentration level almost two orders of magnitude below the usual breakthrough level. This highly reduced level of CWA is blocked by the MOF nanocrystal-filled membrane substrate layer over a highly extended period of time. The experimentation discussed herein demonstrates blockage of CWAs, Mustard (HD), Soman (GD), a Sarin simulant (dimethyl methyl phosphonate (DMMP)) and ammonia for an extended period of time, while moisture transmission rate remains substantial. Based on experimentation, the times for complete blockage of ammonia, HD, GD and DMMP were 2,750 minutes, 1,075 minutes, 176 minutes, and 7 days, respectively. Such improved performance is provided by a low steady-state penetrant permeation through the GOlaminate membrane and substantial penetrant sorption by MOF nanocrystals. Both layers show high moisture vapor transmission.

During experimentation performed in developing the exemplary material, a 79 μm thick, porous flat membrane-supported nano-packed bed of MOF UiO-66-NH$_2$ was developed and tested, and needed about 200-300 minutes for ammonia to appear in the dead-end mode on the other side of the membrane. (See, e.g., Song, Y. et al., *Membrane-supported metal organic framework based nanopacked bed for protection against toxic vapors*, Separation and Purification Technology. 2020, 251, 117406). In the study, the MVTR values were about 5000 g/m$^2$-day. See id. A graphene oxide (GO) based barrier membrane possessing a high MVTR was tested to drastically reduce the permeation rate of CWAs. (See, e.g., Peng. C. et al., *Graphene oxide-based membrane as protective barrier against toxic vapors and gases*, ACS Appl. Mater. Interfaces. 2020, 12, 11094-11103). Under appropriate conditions, graphene (GR)-based as well as GO-based membranes may shut off gas permeation except for moisture vapor and traces of He. (See, e.g., Nair, R. R. et al., *Unimpeded permeation of water through helium-leak-tight graphene-based membranes*, Science. 2012, 335, 442-444). Multilayered GO platelet-based membranes at zero relative humidity (RH) were found to be essentially impermeable to small gases, but allow H$_2$O vapor to pass through GO nano-capillaries between GR sheets via water monolayers. (See, e.g., Peng, C. et al., *Graphene oxide-based membrane as protective barrier against toxic vapors and gases*, ACS Appl. Mater. Interfaces. 2020, 12, 11094-11103). Such a structure prevents other gases/vapors from flowing, especially under reduced humidity. See id. Experimentation showed that a multilayered GO membrane blocked DMMP vapor for 15 days. See id. Additional studies illustrate and illuminate the barrier properties of GO-based membranes. (See, e.g., Steinberg. R. S. et al., *Breathable Vapor Toxicant Barriers Based on Multilayer Graphene Oxide*, ACS Nano. 2017, 11, 5670-5679; Chen, P. Y. et al., *Ultrastretchable graphene-based molecular barriers for chemical protection, detection, and actuation*, ACS Nano. 2018, 12, 234-244; Petukhov, D. I. et al., *Thin graphene oxide membranes for gas dehumidification*, J. Membrane Sci. 2019, 577, 184-194; Eliseev, A. A. et al., *Operando study of water vapor transport through ultrathin graphene oxide membranes*, 2D Mater. 2019, 6, 035039).

Further experimentation was performed to explore the breakthrough and permeation behavior of toxic gases and vapors through a novel composite structure: a GO-based multilayered composite membrane at the top exposed to the toxic gas mixture and backed up by a membrane-supported MOF, UiO-66-NH$_2$, forming a nano-packed bed at the bottom/permeate side. Previous fabrication of a porous expanded polytetrafluoroethylene (cPTFE) membrane-supported nanopacked bed of MOF nanocrystals via solvothermal synthesis (see, e.g., Song, Y. et al., *Membrane-supported metal organic framework based nanopacked bed for protection against toxic vapors*, Separation and Purification Technology. 2020, 251, 117406) involved a lengthy solvent exchange procedure to incorporate 80-20 ratio of DMF-methanol solvent mixture in the pores of the PTFE membrane since DMF does not wet the pores of the hydrophobic ePTFE membrane but is needed for MOF synthesis. (See, e.g., Cavka, J. H. et al., *A new zirconium inorganic building brick forming metal organic frameworks with exceptional stability*, J. Am. Chem. Soc. 2008, 130, 13850-13851; Kandiah, M. et al., *Synthesis and stability of tagged UiO-66*

*Zr-MOFs*, Chem. of Mater. 2010, 22, 6632-6640). A more facile synthesis of the structure was pursued. The CWAs/vapors/gases whose blockages/permeations were studied included dimethyl methyl phosphonate (DMMP) (a sarin-simulant), sulfur mustard (HD), nerve agent Soman (GD), NH$_3$ and N$_2$. Two sample sizes were prepared for various experiments: 4.7 and 9.0 cm. The experimentation shows a complete shut-off or blockage of CWAs, HD and GD, a CWA simulant, DMMP and NH$_3$ for an extended period of time.

Figure 1C:
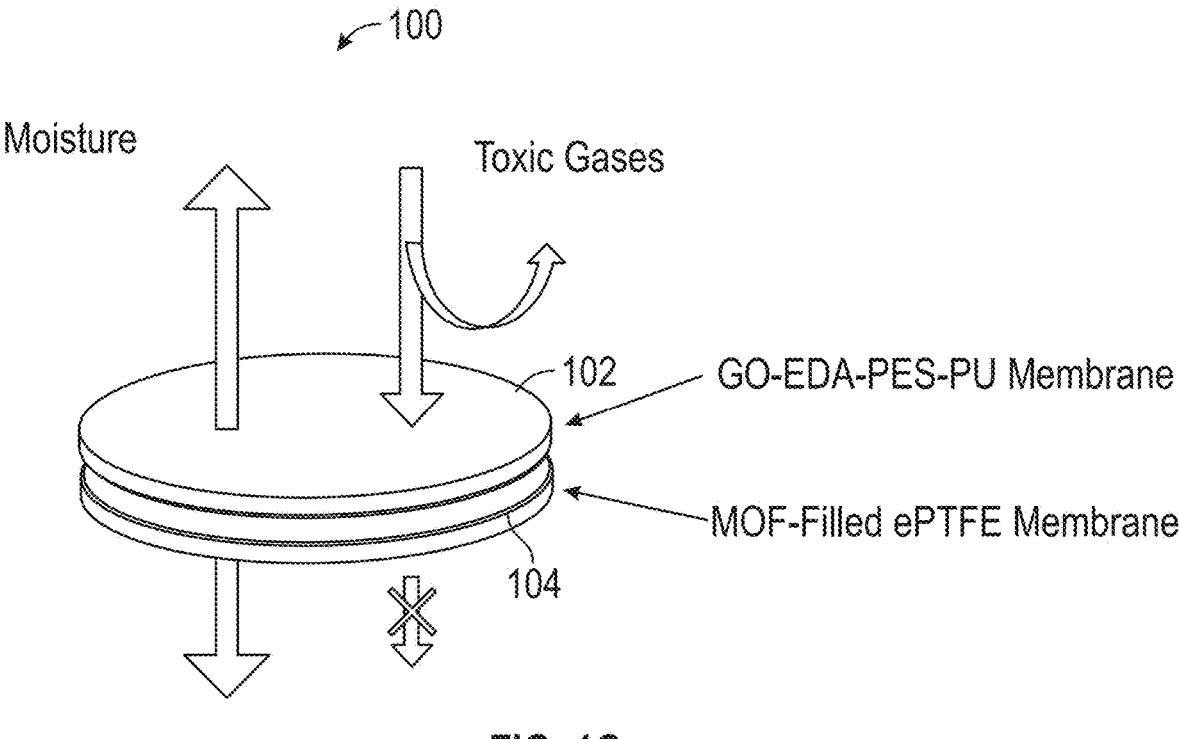
FIG. 1C is a diagrammatic view of an exemplary protective material in accordance with the present disclosure.
Figure 1D:
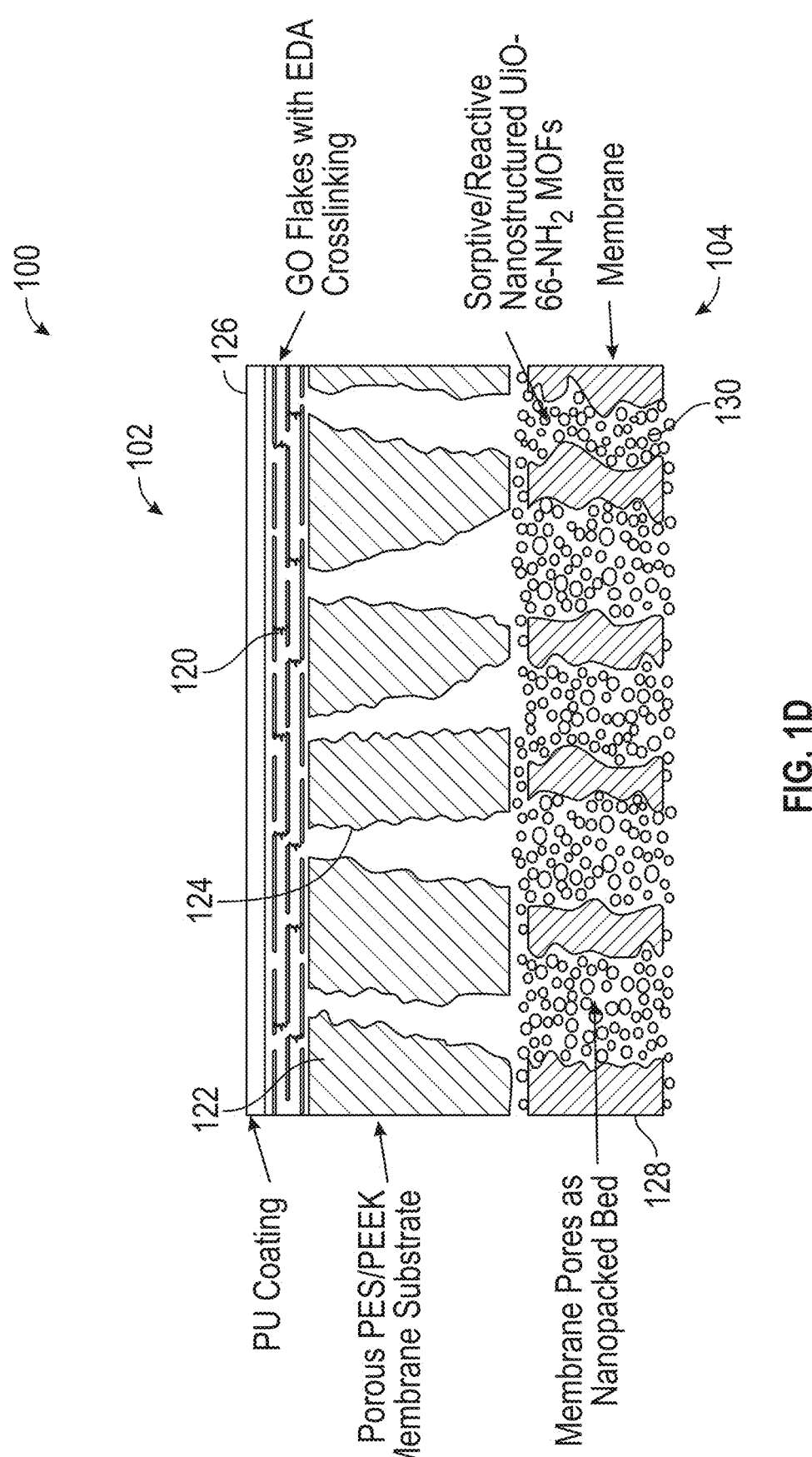
FIG. 1D is a diagrammatic cross-sectional view of another exemplary protective material in accordance with the present disclosure.
Figure 1E:
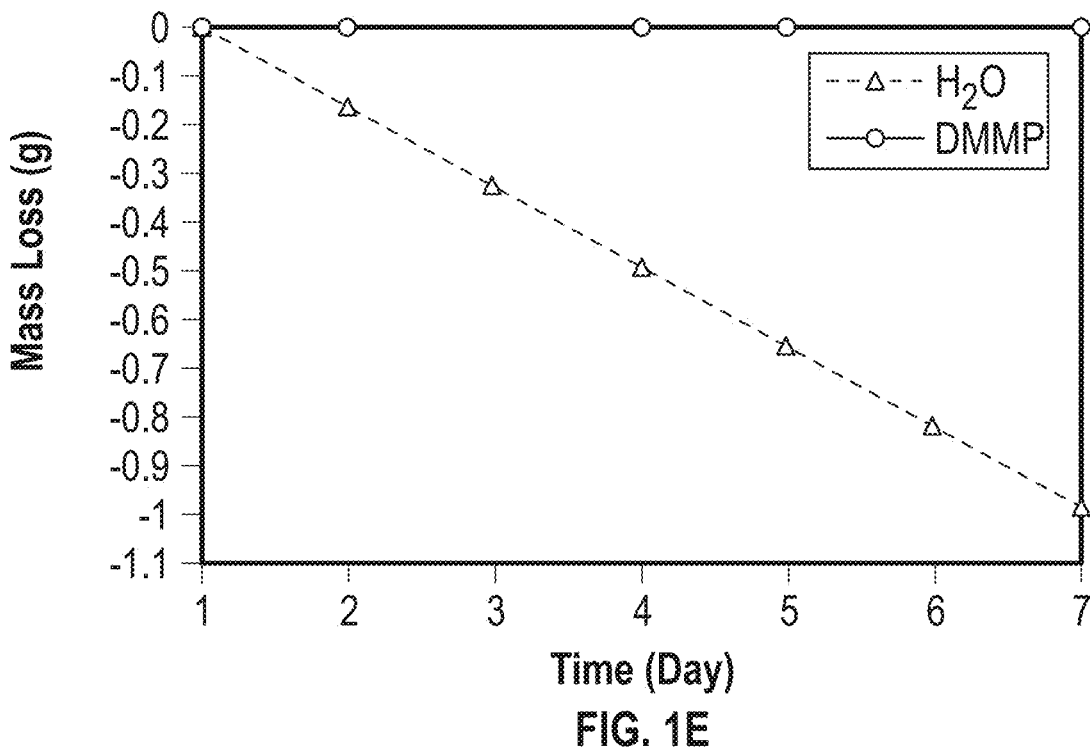
FIG. 1E is a chart illustrating moisture transmission performance and DMMP blockage performance of an exemplary protective material in accordance with the present disclosure.
Figure 1F:
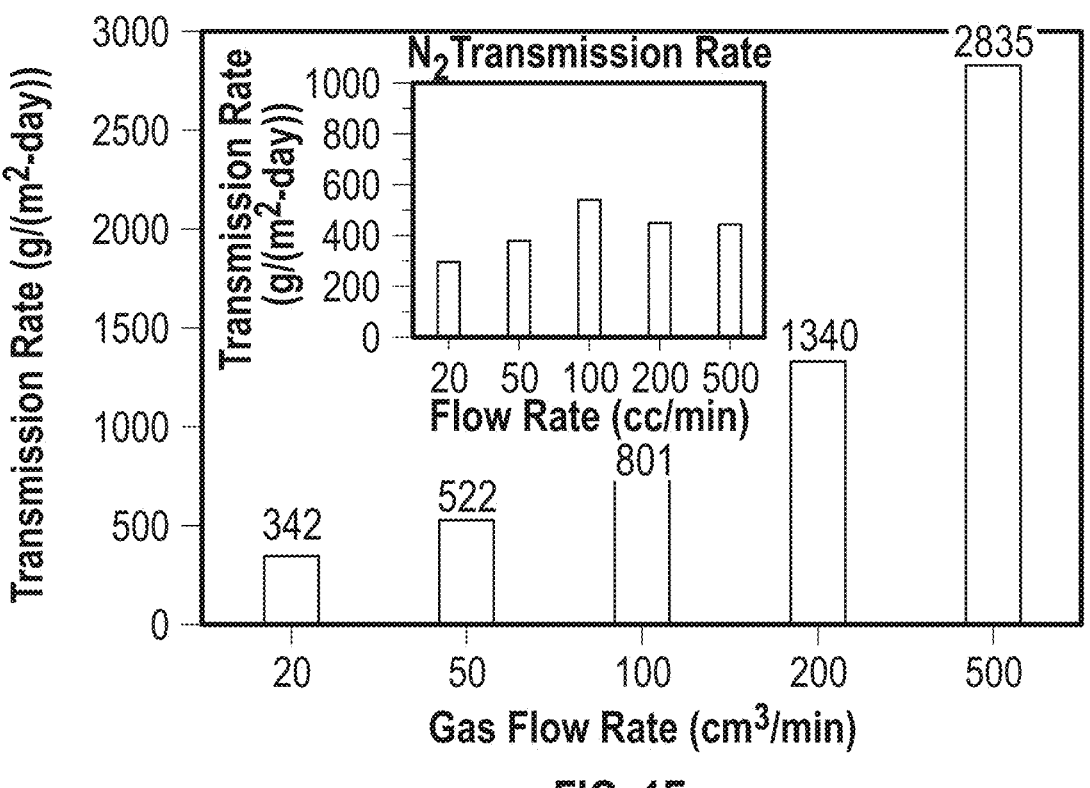
FIG. 1F is a chart illustrating vapor/gas performance of an exemplary protective material in accordance with the present disclosure.

FIGS. 1A-1F relate to the exemplary protective material of the present disclosure, and are discussed in greater detail below. The GO-MOF multilayer membrane of the material and illustrative 25° C. performances for DMMP blockage and moisture removal by the material are provided by FIGS. 1A-1F. FIG. 1A is a schematic of the material for blockage, including a GO laminate membrane on top of a MOF-filled porous membrane. FIG. 1B illustrates CEES permeation rates through individual barriers: GO laminate membrane (see, e.g., Peng, C. et al., *Graphene oxide-based membrane as protective barrier against toxic vapors and gases*, ACS Appl. Mater. Interfaces. 2020, 12, 11094-11103); and UiO-66-NH$_2$ MOF-filled porous ePTFE membrane (see, e.g., Song, Y. et al., *Membrane-supported metal organic framework based nanopacked bed for protection against toxic vapors*, Separation and Purification Technology. 2020, 251, 117406). FIG. 1C provides a functional schematic of a moisture-permeable multilayer barrier against toxic gases and vapors. FIG. 1D provides details of the multilayer structure-schematic for the protective material. FIG. 1E illustrates upright cup method results in separate experiments for water vapor and Sarin simulant DMMP for the GO-MOF multilayer membrane for 7 days. FIG. 1F illustrates moisture transmission rates obtained in the DMPC for GO-MOF multilayer membrane. The material or membrane dimensions for the experiments associated with the results illustrated in FIGS. 1E and 1F are 1.8 cm and 3.0 cm, respectively.

FIG. 1A is a diagrammatic cross-sectional view of an exemplary protective material 100 having a multilayer structure. The material 100 includes a first or top layer 102 positioned immediately adjacent to and coupled to a second or bottom layer 104. The first layer 102 can be an outer layer and the second layer 104 can be an inner layer when the material 100 is used to fabricate protective wear, with the inner layer being closest to the skin of the user or the item to be protected. The first layer 102 includes a microporous membrane 106 including a plurality of openings 108 formed therein and supporting a cross-linked graphene oxide (GO) 110. The first layer 102 can therefore be a laminated GO membrane. The second layer includes a porous membrane 112 including openings, pores or channels 114 supporting a nanopacked bed 116 of a suitable metal organic framework (MOF). The MOF can be, e.g., sorptive or reactive nano-structured UiO-66-NH$_2$ or any other suitable MOF sorbent.

The top layer 102 built of a multi-layered GO platelet-based membrane is essentially impermeable to small gases at zero relative humidity (RH) but allows H$_2$O vapor to pass through GO nano-capillaries between closely-spaced graphene (GR) sheets via water monolayers. (See, e.g., Nair, R. R. et al. *Unimpeded permeation of water through helium-leak-tight graphene-based membranes*, Science. 2012, 335, 442-444). Under humid conditions, water vapor shows high selectivity over various small gases/vapors e.g., N$_2$, ethanc. (See, e.g., Pong. C. et al., *Graphene oxide-based membrane as protective barrier against toxic vapors and gases*, ACS Appl. Mater. Interfaces. 2020, 12, 11094-1110). Earlier studies showed considerable selectivity for water vapor over environmental toxicants, e.g., benzene, hexane, and chloroform. (See, e.g., Steinberg, R. S. et al., *Breathable Vapor Toxicant Barriers Based on Multilayer Graphene Oxide*, ACS Nano. 2017, 11, 5670-5679; Chen, P. Y. et al., *Ultra-stretchable graphene-based molecular barriers for chemical protection, detection, and actuation*, ACS Nano. 2018, 12, 234-244). Experimentation of the membrane 106 material demonstrated a complete blockage of toluene. (See, e.g., Peng, C. et al., *Graphene oxide-based membrane as protective barrier against toxic vapors and gases*, ACS Appl. Mater. Interfaces. 2020, 12, 11094-1110). The top GO-layer 102 is placed over a nanoporous membrane (i.e., bottom layer 104) whose pores are filled with UiO-66-NH$_2$ MOF nanocrystals.

FIGS. 2A-2F illustrate steps of fabricating a top layer 102 (e.g., the GO layer, the PES-EDA-GO-PU layer, or the like) of the protective material 100. In FIG. 2A, the first step involves mixing of 32 mg GO with 20 mg SDS and 10 ml DI water. In FIG. 2B, the second step involves adding 10 mL EDA, 100 mL DI water, and mixing in a cold-water bath. In FIG. 2C, the third step involves vacuum filtration and washing with an EDA solution. In FIG. 2D, the fourth step involves physical compression of the material. In FIG. 2E, the fifth step involves heat treatment of the material at 80° C. In FIG. 2F, the sixth step involves spray coating the material with PU.

FIG. 1B is a chart illustrating an individual permeation behavior of each individual layer of the material 100 during experimentation performed in testing the permeation characteristics of the material 100. When exposed to a feed concentration of 300 mg/m$^3$ of CEES in air, the MOF-containing layer blocked CEES transmission completely for 46 min. After 46 minutes, CEES slowly appeared and completely broke through at around 150 min. (See, e.g., Song. Y. et al., *Membrane-supported metal organic framework based nanopacked bed for protection against toxic vapors*, Separation and Purification Technology. 2020, 251, 117406). The breakthrough concentration was 12 mg/m$^3$ due to dilution by sweep air on the other side of the membrane. When the GO-layer was exposed to the same 300 mg/m$^3$ of CEES containing air stream, there was complete blockage for only 16 min. However, CEES then slowly appeared and maintained a steady rate of permeation for a constant breakthrough concentration of around 0.25 mg/m$^3$ (corresponding to a steady 97.2% rejection with respect to a breakthrough concentration of 12 mg/m$^3$) for 600 min when the experiment was stopped. This low value of 0.25 mg/m$^3$ should be contrasted with the high breakthrough concentration of 12 mg/m$^3$ in the case of the MOF barrier. These indicate that the strong reduction of the CEES permeation rate through the top GO layer provides such a low level of challenge for the MOF-containing layer as to prevent a breakthrough for a considerable length of time. The two layers have altogether different functions from CWA sorption/transport perspectives and can in combination provide a platform for blocking other vapors/gases by selecting appropriate MOFs. The two layers can therefore be customized and/or selected based on one or more combinations of vapors/gases to be blocked to ensure the desired blockage rates and times are achieved. In some embodiments, the material of the two layers can be specifically selected based on the type of vapors/gases to be blocked. In some embodiments, the material of the two layers can be successful in blocking all types of vapors/gases.

FIG. 1C is a diagrammatic view of the protective material 100. The material 100 defines a layered structure that blocks toxic penetrants but allows moisture to pass through. FIG. 1D provides a detailed cross-sectional view of the layered structure of the material 100. The top layer 102 includes a GO laminate-based membrane 120 crosslinked with ethylene diamine (EDA). The membrane 120 is supported at the bottom on a porous polyethersulfone membrane 122 having openings 124 passing therethrough, via π-π bonding (see, e.g., Kuila, T. et al., *Facile method for the preparation of water dispersible graphene using sulfonated poly (ether-ether-ketone) and its application as energy storage materials*, Langmuir. 2012, 28, 9825-9833), and is coated at the top (opposing surface) by a thin polyurethane (PU) coating 126 as an anti-scratching layer. The bottom layer 104 of the material 100 structure is a 79 μm thick, porous ePTFE membrane 128 whose sub-micrometer pores/interfibrillar space 130 are filled with nanocrystals and sub-micrometer size crystals of MOF, UiO-66-NH$_2$. grown in situ by solvothermal synthesis. (See, e.g., Song, Y. et al., *Membrane-supported metal organic framework based nanopacked bed for protection against toxic vapors*, Separation and Purification Technology. 2020, 251, 117406). The performance of the multilayer structure as a vapor/gas barrier is illustrated for moisture and Sarin-simulant DMMP in FIGS. 1E and 1F. Using the Upright Cup test method (see, e.g., FIGS. 3A-3B), FIG. 1E plots the data of mass loss vs. time in days obtained in separate experiments for moisture and DMMP. For 7 days, no loss was recorded for DMMP, but there was significant and continuing loss of water. The data for mass loss is available in Table 1 (below), along with the water vapor flux.

Figure 3A:
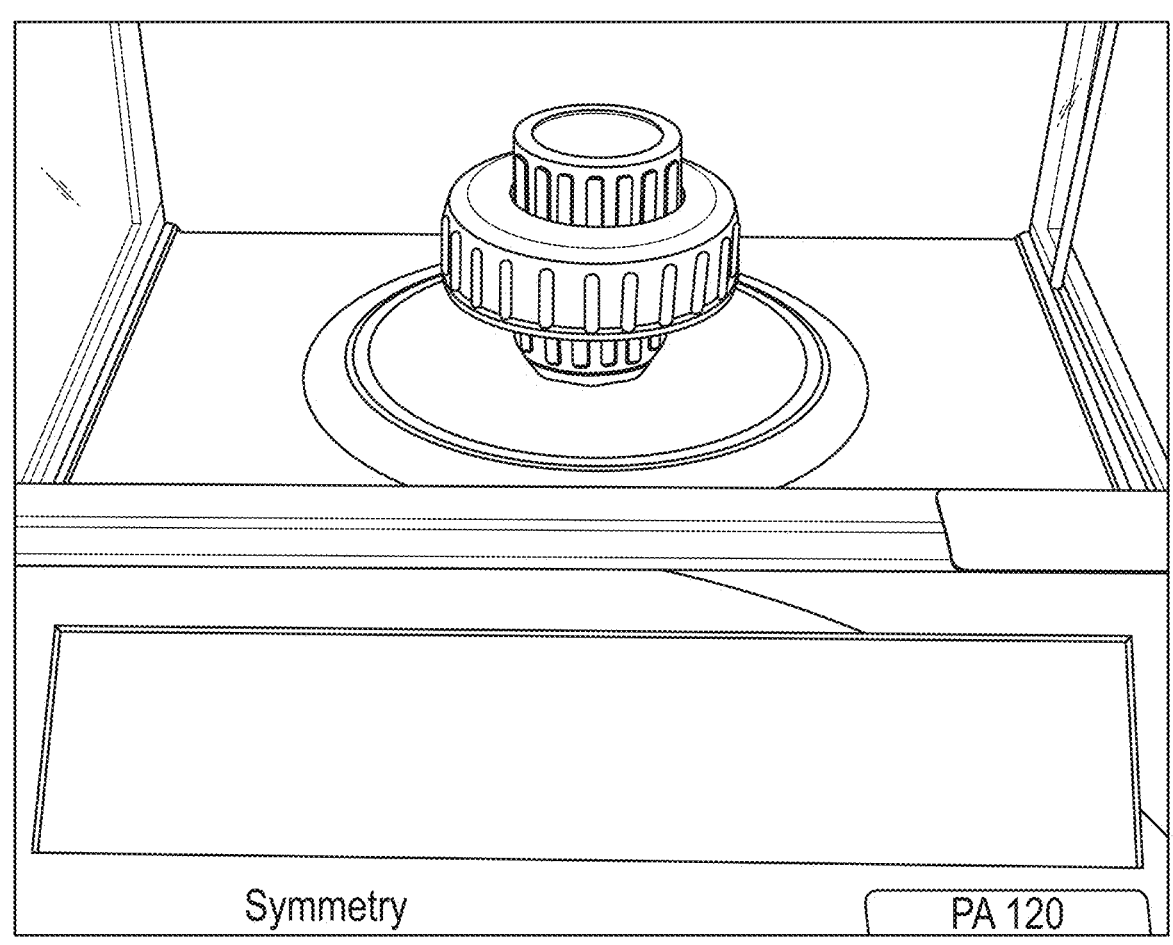
FIG. 3A is a perspective view of an Upright Cup testing setup for testing of an exemplary protective material.
Figure 3B:
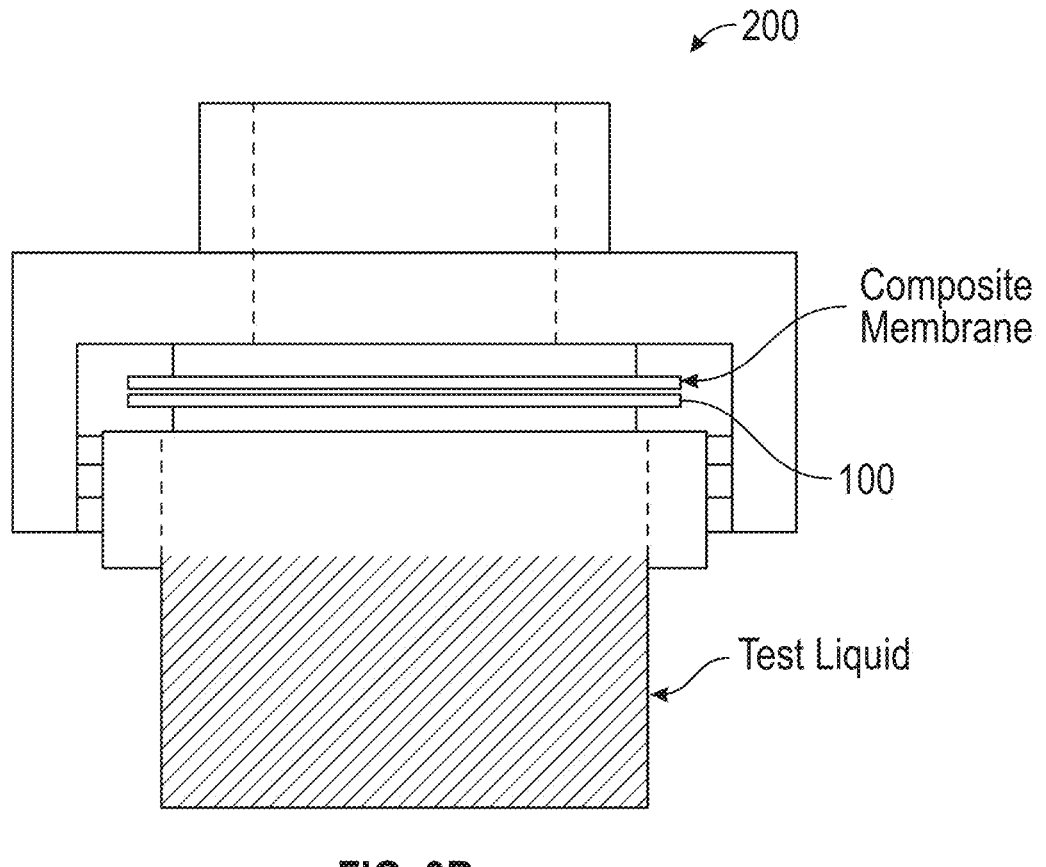
FIG. 3B is a diagrammatic cross-sectional view of an Upright Cup testing setup for testing an exemplary protective material.

FIGS. 3A and 3B are perspective and diagrammatic, cross-sectional views of an experimental setup of an Upright Cup test for testing the protective material 100 for vapor permeance. FIGS. 3A and 3B include a test cell for the vapor permeance determination. Table 1 provides the experimental results of the Upright Cup method. The results of Table 1 include data on water vapor and DMMP mass loss for the GO-MOF composite membrane for 7 days. The water vapor flux was calculated over 7 days for the membrane area of $1.77 \times 10^4$ m$^2$ using Equation 1 below.

$$\text{Flux} = 0.983 \text{ g} \div (1.77 \times 10^{-4} \text{m}^2) \div 7 \text{ day} = 793 \text{ g/m}^2 \cdot \text{day} \qquad (1)$$

TABLE 1

| Water vapor and DMMP results for Upright Cup test Water vapor and DMMP | | | | | | | |
|---|---|---|---|---|---|---|---|
| Days | 1 | 2 | 3 | 4 | 5 | 6 | 7 |
| Mass loss/ DMMP, g | 0 | −0.0006 | 0.0004 | −0.0003 | 0.0004 | 0.0007 | 0.0005 |
| Mass loss/ H$_2$O, g | 0 | −0.163 | −0.330 | −0.491 | −0.652 | −0.820 | −0.983 |

Figure 4:
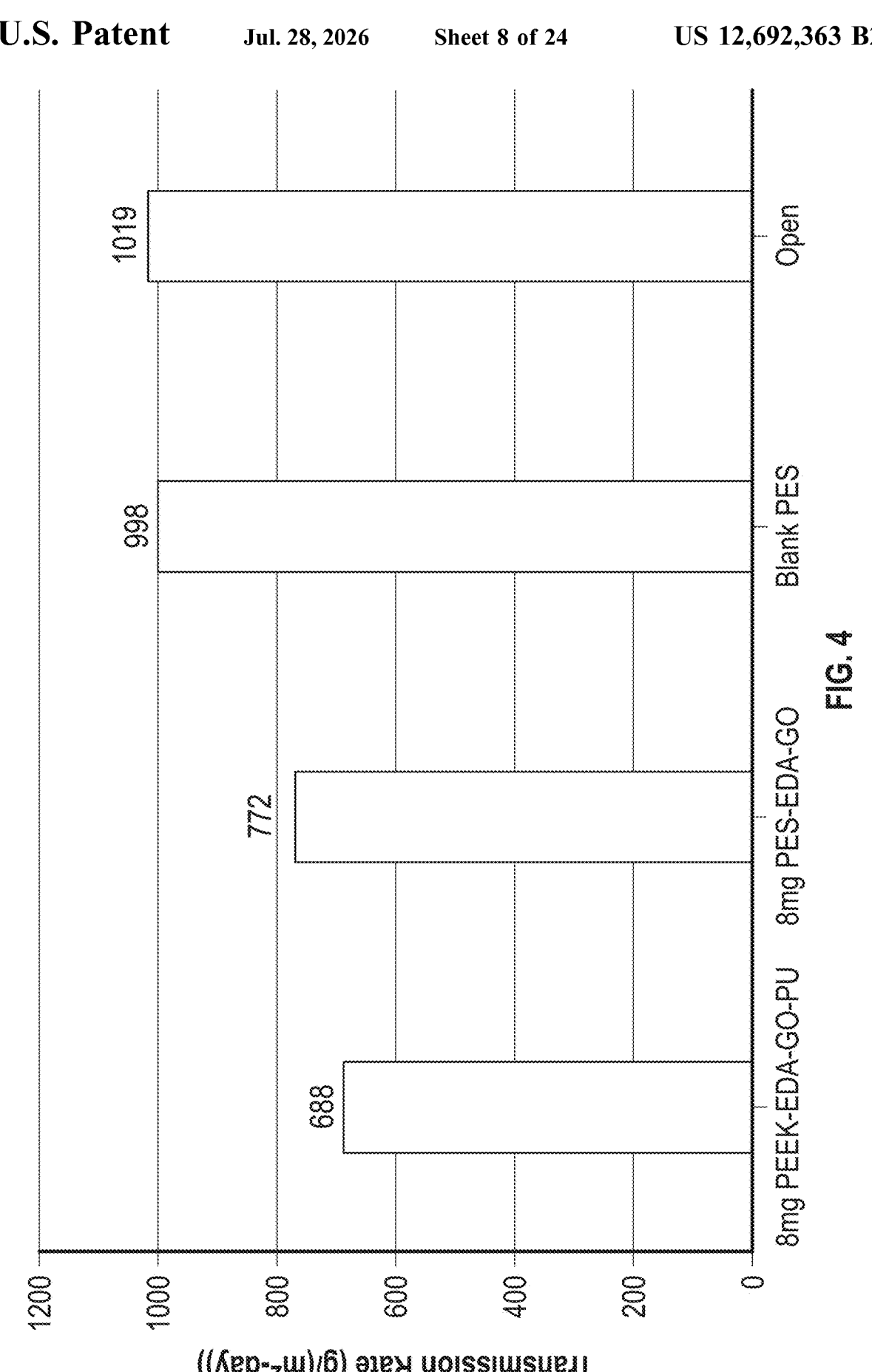
FIG. 4 is a chart illustrating transmission rates of moisture in an Upright Cup test for a top layer of an exemplary protective material.
Figure 5A:
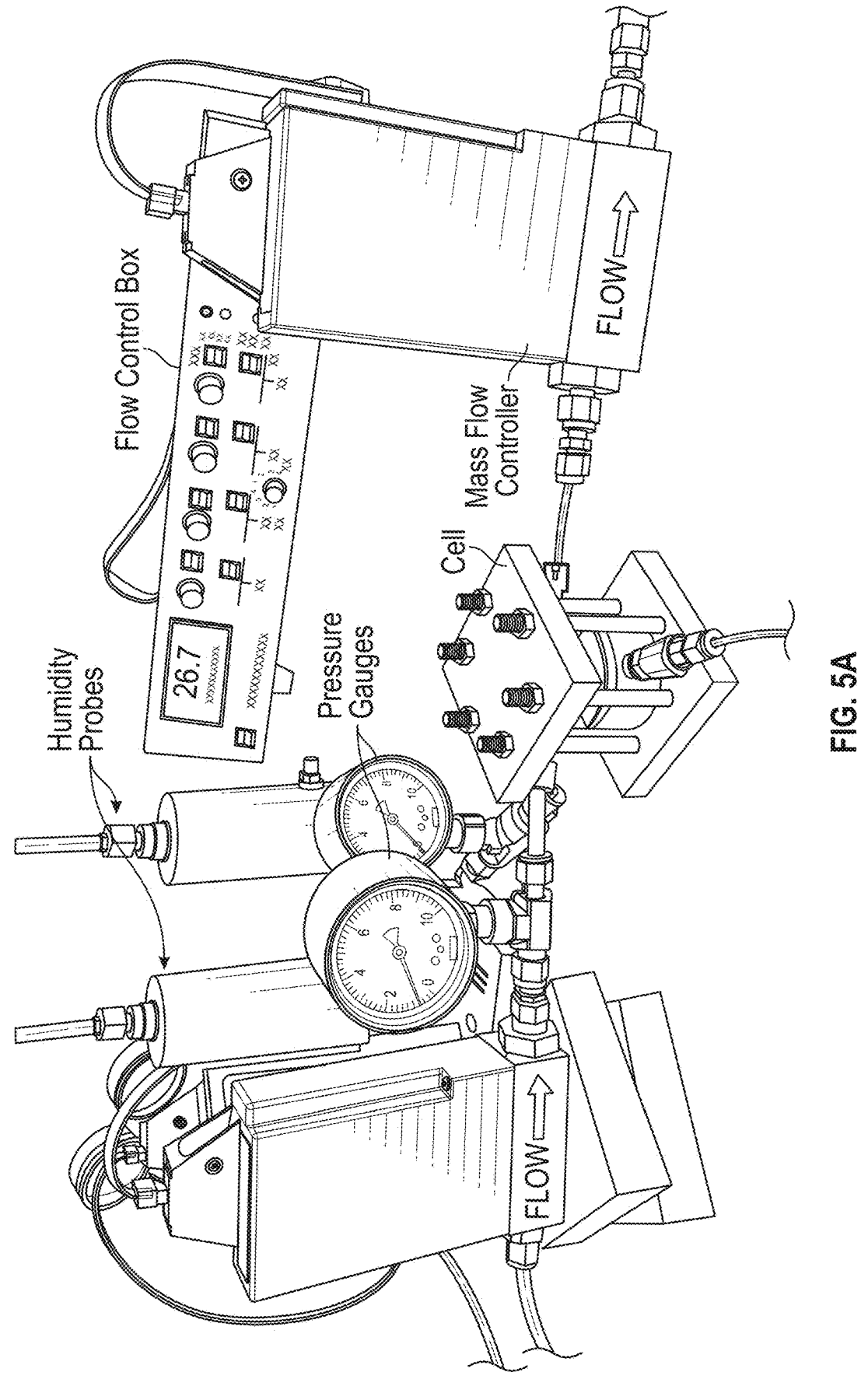
FIG. 5A is a perspective view of a Dynamic Moisture Permeation Cell (DMPC) setup for determining a true moisture vapor permeation rate of an exemplary protective material.
Figure 5B:
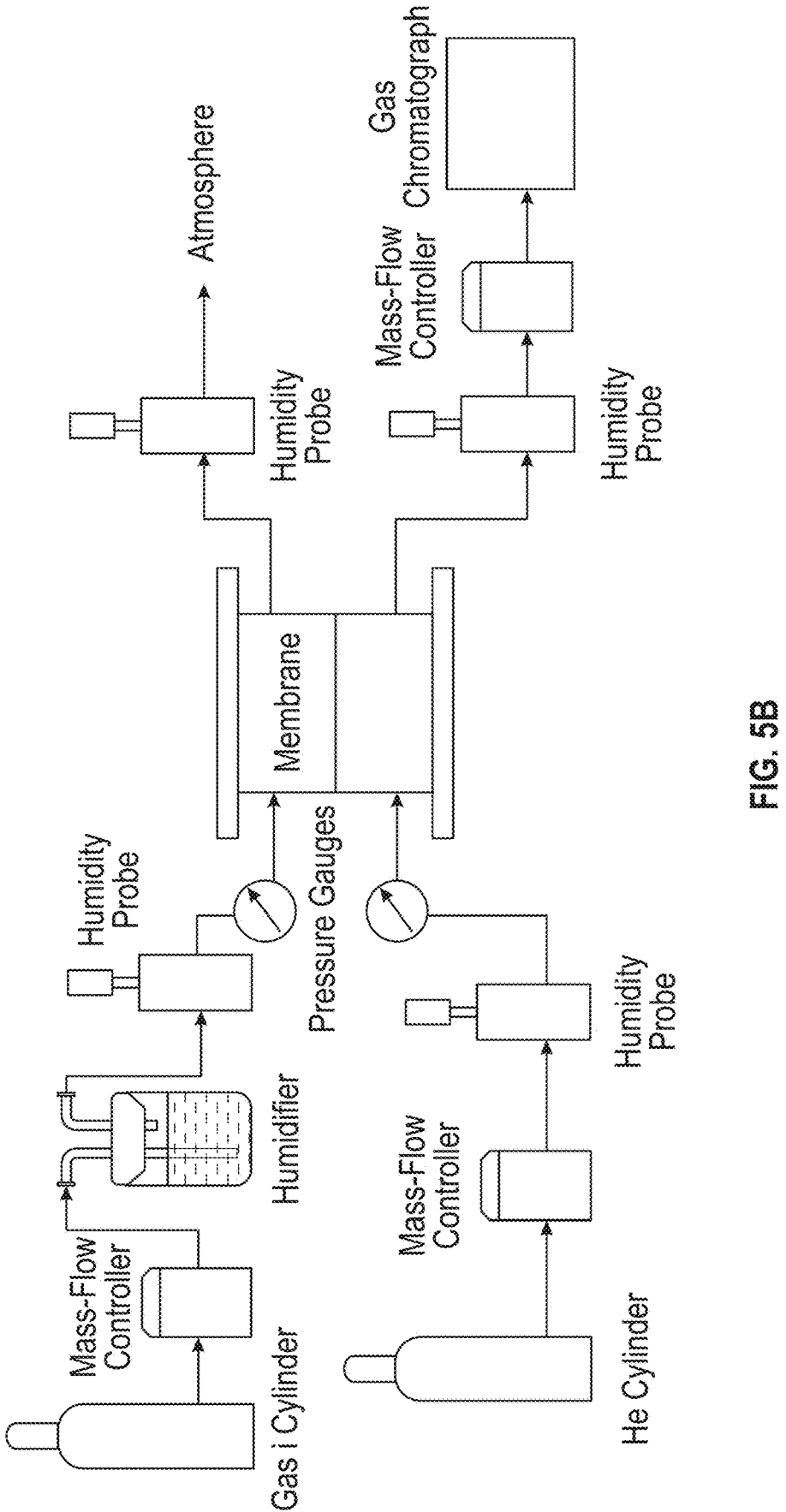
FIG. 5B is a diagrammatic view of the DMPC of FIG. 5A.

The corresponding values for only the GO layer 102 of the material are provided in FIG. 4, which also illustrates the considerable effect of the boundary layer resistance in the Upright Cup method. In particular, FIG. 4 provides the transmission rates of moisture in the Upright Cup method for the GO laminate layer and other membranes: 8 mg PEEK-EDA-GO-PU; 8 mg PES-EDA-GO; blank PES substrate; no membrane with open cup top at 25° C. To determine the true moisture vapor permeation rate, the Dynamic Moisture Permeation Cell (DMPC) was used (FIGS. 5A-5B) to eliminate the boundary layer resistance by increasing the feed and He sweep gas flow rate. (See, e.g., Gibson, P. W. et al., *An automated dynamic water vapor permeation test method*, Performance of Protective Clothing. ASTM International. 1997, 6). As illustrated in FIG. 5A, the DMPC setup includes humidity probes, pressure gauges, a flow control box, a mass flow controller, and a test cell. As illustrated in FIG. 5B, the DMPC setup includes a gas i cylinder as input to a mass-flow controller, an output from the controller as input to a humidifier, an output from the humidifier as input to a humidity probe, and an output from the humidity probe as input to pressure gauges that lead to a membrane. A He cylinder provides input to another mass-flow controller, output from the controller as input to a humidity probe, and output from the controller as input to pressure gauges that lead to the other side of the membrane. One output from the membrane leads to a humidity probe, with the probe output to atmosphere. Another output from the membrane leads to another humidity probe, output from the probe as input to a mass-flow controller, and output from the controller as input to a gas chromatograph. As shown in FIG. 1F, the measured MVTR exceeds the required minimum of 1500-2000 g/m²-day. (See, e.g., Bui, N. et al., *Ultrabreathable and protective membranes with sub-5 nm carbon nanotube pores*, Advanced Materials. 2016, 28, 5871-5877; Peng, C. et al., *Graphene oxide-based membrane as protective barrier against toxic vapors and gases*, ACS Appl. Mater. Interfaces. 2020, 12, 11094-11103). The insert in FIG. 1F shows that the feed and sweep gas flow rate variation does not influence the permeance of the much less permeable gas, $N_2$. Permeances of the following gas species, $N_2$, ethane, ethylene, He as well as water vapor measured in the DMPC through such a multi-layered structure (i.e., material 100) and provided in Table 2 show how high the water vapor permeance is compared to those of others

TABLE 2

| Species permeances through multilayered GO-MOF membrane for several gases/vapors in a permeation apparatus having A DMPC | | | | | |
|---|---|---|---|---|---|
| Feed gas flow rate | Permeance × 10⁹ mol/(s · m² · Pa) | | | | |
| cc/min | He | $N_2$ | Ethylene | Ethane | $H_2O$ |
| 500 | 97 | 3.1 | 0.51 | 0.46 | 672 |

The permeance value of Table 2 was calculated using Equation 2 (below), with the Sweep outlet flow rate of gas i calculated using Equation 3 (below). The sweep gas flow rate was 500 cc/min.

$$Q_{im}/\delta_m = \text{Permeance of Gas } i = \frac{\text{Sweep outlet flow rate of gas } i}{\text{Area} \times \Delta \text{partial pressure}} \quad (2)$$

$$\text{Sweep outlet flow rate of gas } i = \quad (3)$$
$$\text{Sweep outlet flow rate} \times \text{the percentage of gas } i$$

Figure 6A:
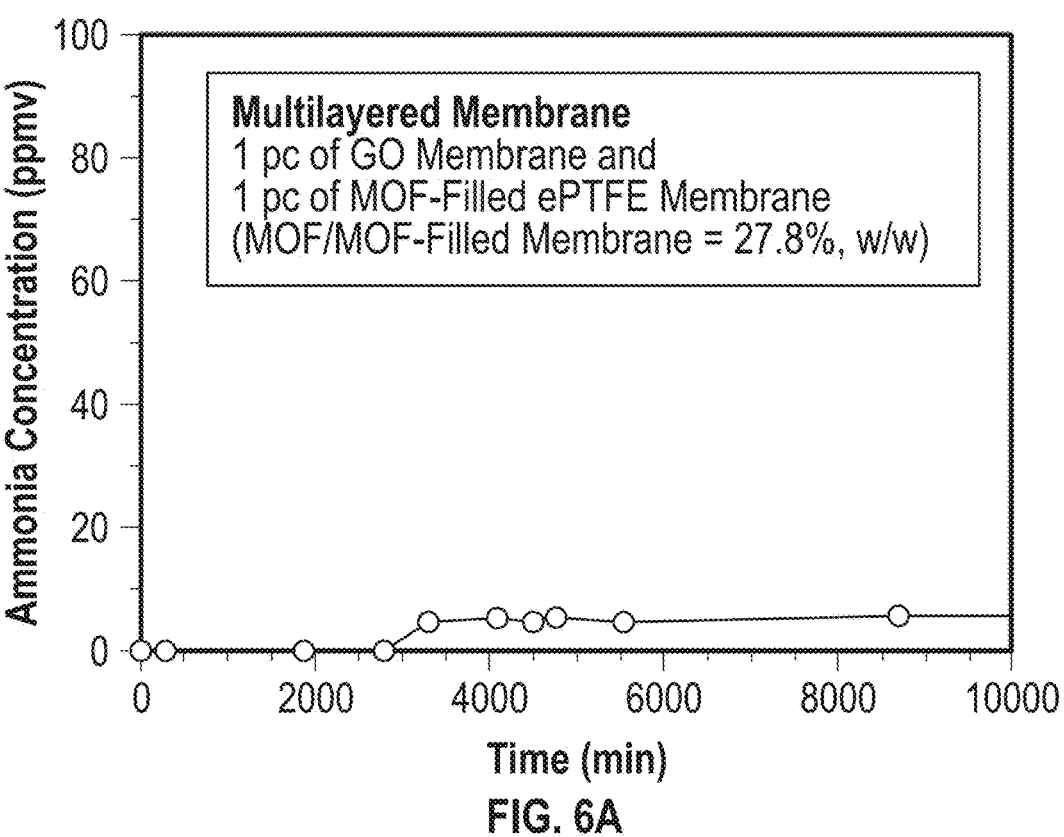
FIG. 6A is a chart illustrating experimental results of an exemplary protective material (47 mm diameter) exposed to a feed $N_2$ stream (containing a small amount of $NH_3$) supported by the MOF-filled membrane at the bottom.
Figure 6B:
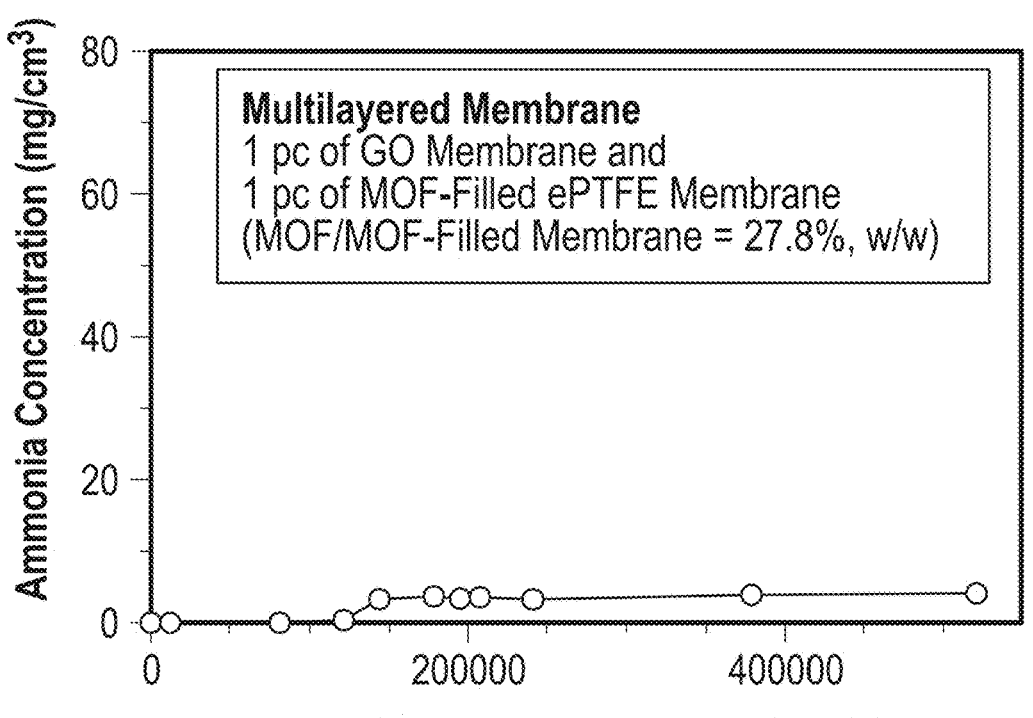
FIG. 6B is a chart illustrating experimental results of an exemplary protective material with $NH_3$ blockage vs. time/(weight of MOF and ePTFE membrane in the multilayer membrane)
Figure 6C:
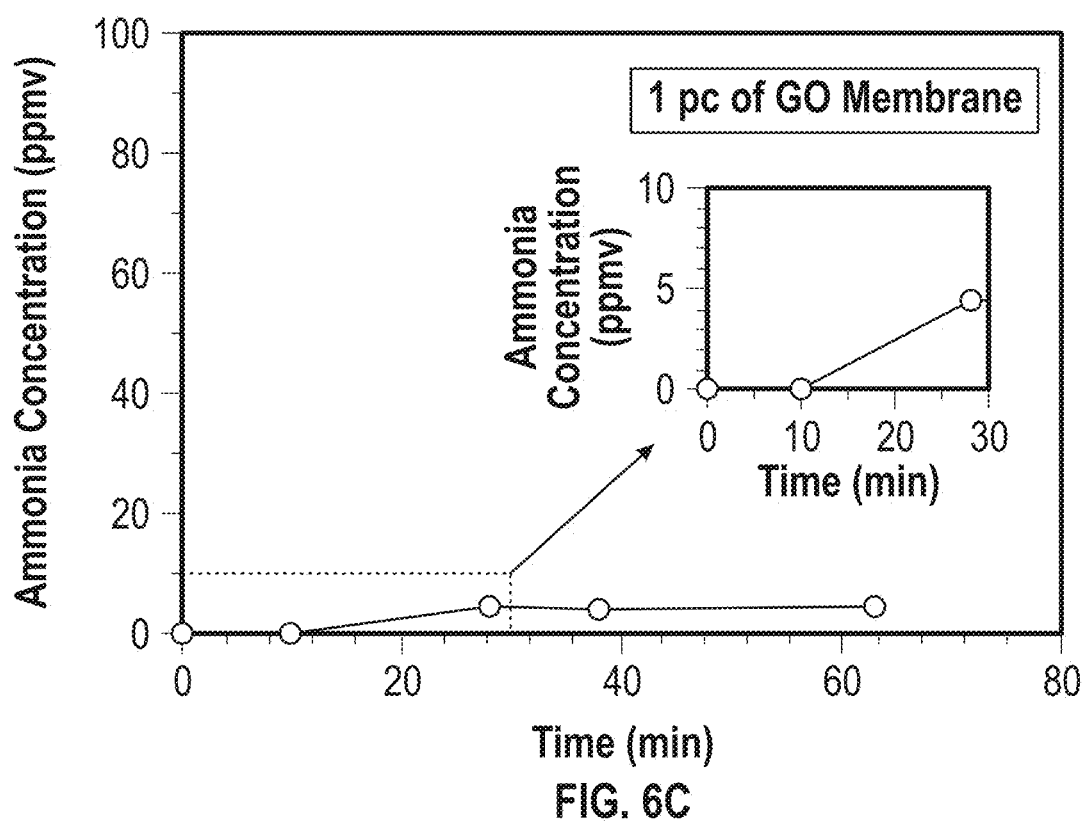
FIG. 6C is a chart illustrating experimental results of an exemplary protective material with $NH_3$ blocking behavior by the GO layer only.
Figure 6D:
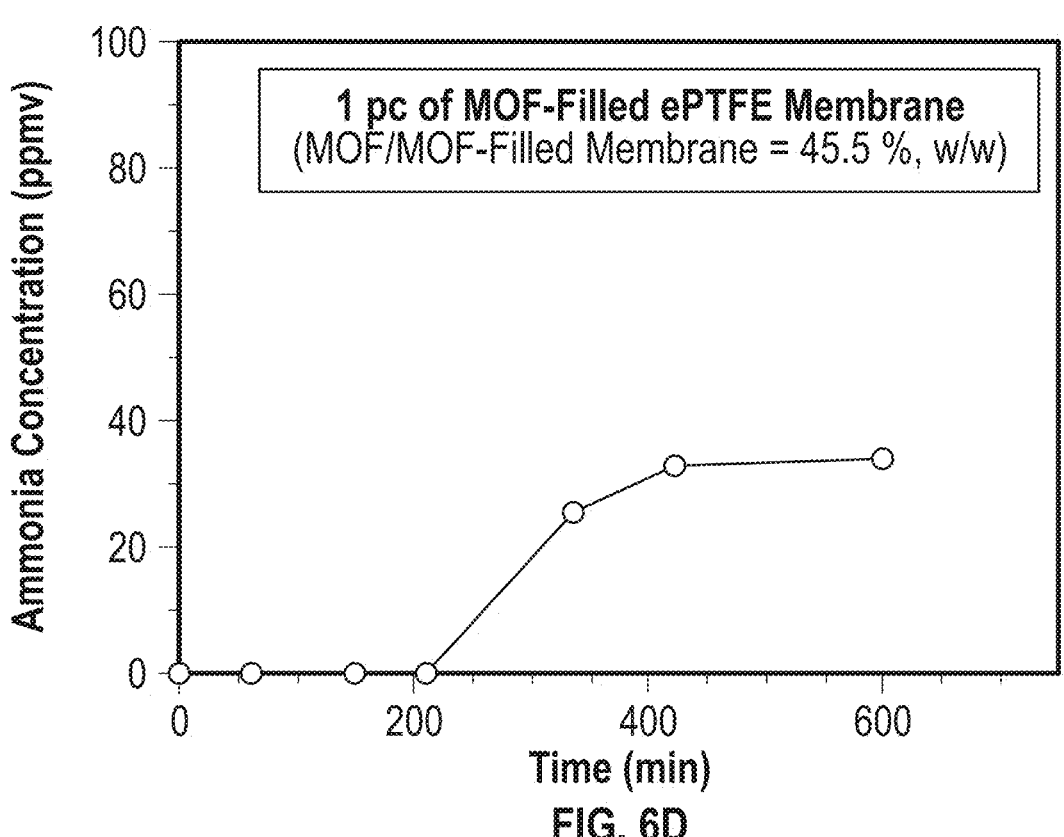
FIG. 6D is a chart illustrating experimental results of an exemplary protective material with $NH_3$ blocking behavior by the MOF-filled ePTFE membrane only.

The performance of a multilayer structured material 100 and its component parts is illustrated in FIGS. 6A-6D when exposed to a 100 ppmv $NH_3$-containing $N_2$ gas stream as feed. The diffusive permeate was picked up by a sweep $N_2$ gas stream in the DMPC. In particular, time dependence of $NH_3$ blockage from a 100 ppmv $NH_3$-containing dry $N_2$ feed gas stream by the multilayer GO-MOF membrane (FIG. 1D)

and two individual membrane parts was determined. (See, e.g., Nagarajan, R. et al., *Nanoscience and Nanotechnology for Chemical and Biological Defense*, ACS Symposium Series; American Chemical Society, 2009; Vol. 1016). FIG. 6A is a chart illustrating experimental results of the protective material (47 mm diameter) exposed to a feed $N_2$ stream supported by the MOF-filled membrane at the bottom; FIG. 6B is a chart illustrating experimental results of the protective material with $NH_3$ blockage vs. time/(weight of MOF and ePTFE membrane in the multilayer membrane); FIG. 6C is a chart illustrating experimental results of the protective material with $NH_3$ blocking behavior by the GO layer only; FIG. 6D is a chart illustrating experimental results of the protective material with $NH_3$ blocking behavior by the MOF-filled ePTFE membrane only. The $N_2$ feed gas stream was flowing at 10 cm³/min at 25° C. in the DMPC.

The base membrane size for the GO layer was 47 mm. The permeate $NH_3$ concentration under feed breakthrough conditions is naturally lower than the feed concentration level of 100 ppmv $NH_3$ due to sweep $N_2$ gas-based dilution. FIG. 6A shows that when a multilayered GO-MOF membrane of FIG. 1D is used, ammonia is blocked for 2790 min; then it appears at an approximately constant level of around 5.3 ppmv after a ramp up. FIG. 6B shows such a result in an alternate fashion by plotting ammonia concentration on the permeate side against the ratio of time per unit weight of ePTFE plus the MOF layer in min/g.

The breakthrough performance of the GO layer of the multilayer membrane is shown in FIG. 6C. This structure completely blocks $NH_3$ for only 10 min; however, its characteristic behavior reduces the steady leakage rate to an extremely low level of 4.4 ppmv. On the other hand, the MOF-filled ePTFE membrane layer of the multilayer structure blocks ammonia for 210 min (FIG. 6D); then ammonia appears in the sweep gas and its concentration there rises slowly and steadily to 34 ppmv. From the experimental results of FIGS. 6A-6D, it is clear that the very low value of the steady leakage rate through the top GO layer of the structure allows the MOF-filled bottom supporting membrane layer to hold back ammonia breakthrough to a high value of 2790 min.

The earlier technique of solvothermal synthesis of UiO-66-$NH_2$ MOF nanoparticles in the sub-micrometer ePTFE membrane pores/interfibrillar space involved an extended 6-step solvent-exchange process to incorporate 80% DMF-20% methanol in the membrane pores which are not spontaneously wetted by the highly polar aprotic DMF-based solvents. (See, e.g., Song, Y. et al., *Membrane-supported metal organic framework based nanopacked bed for protection against toxic vapors*, Separation and Purification Technology. 2020, 251, 117406). The reactants were then introduced into the liquid in the pores by exchange with the outside solution containing the reactants. Such a process may not guarantee inside the membrane pores the level of reactants concentration present outside. Instead, the process for fabricating the material 100 bypassed the solvent exchange process and introduces the reactants-containing 80% DMF-20% methanol solution directly into the ePTFE membrane pores by applying vacuum on the other side of the membrane. A higher level of synthesis of MOFs distributed throughout the membrane pores via repeating such a process results in a significantly higher breakthrough time of 210 min; which contributes considerably to a long ammonia breakthrough time of 2790 min.

Figure 7A:
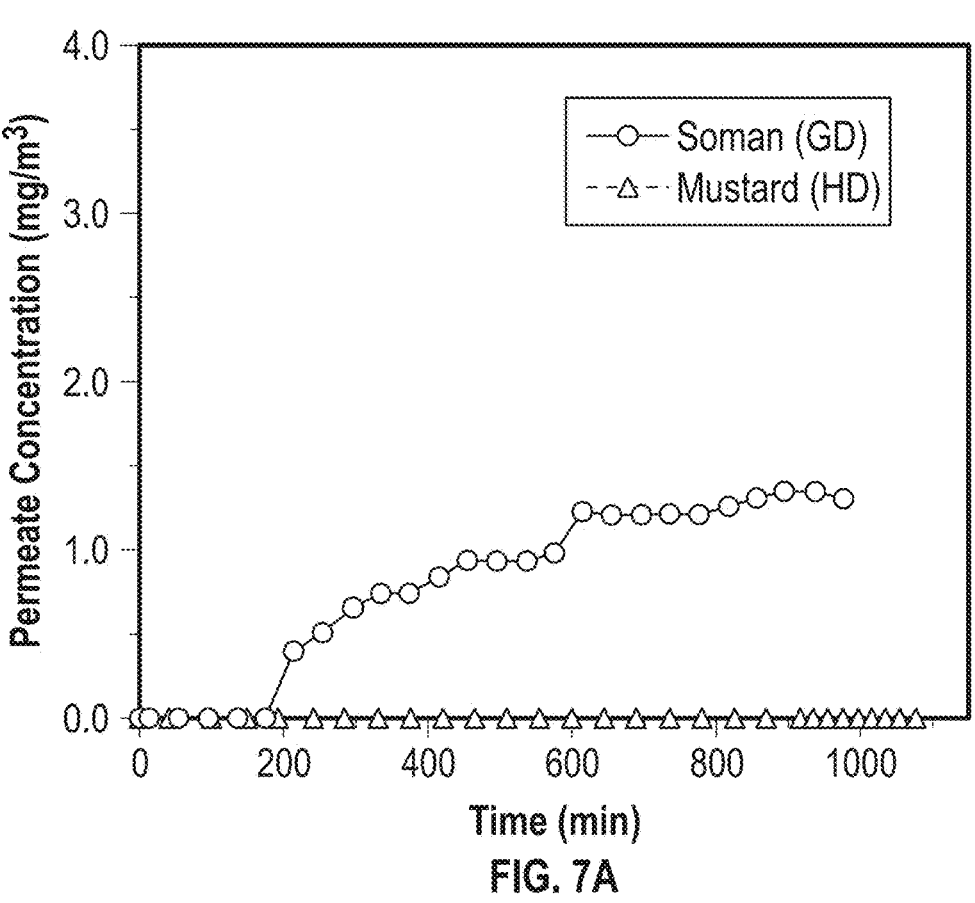
FIG. 7A is a chart illustrating permeation results of CWAs, HD, and GD through one layer of a GO layer stacked on a layer of MOF-filled ePTFE layer of a protective material.
Figure 7B:
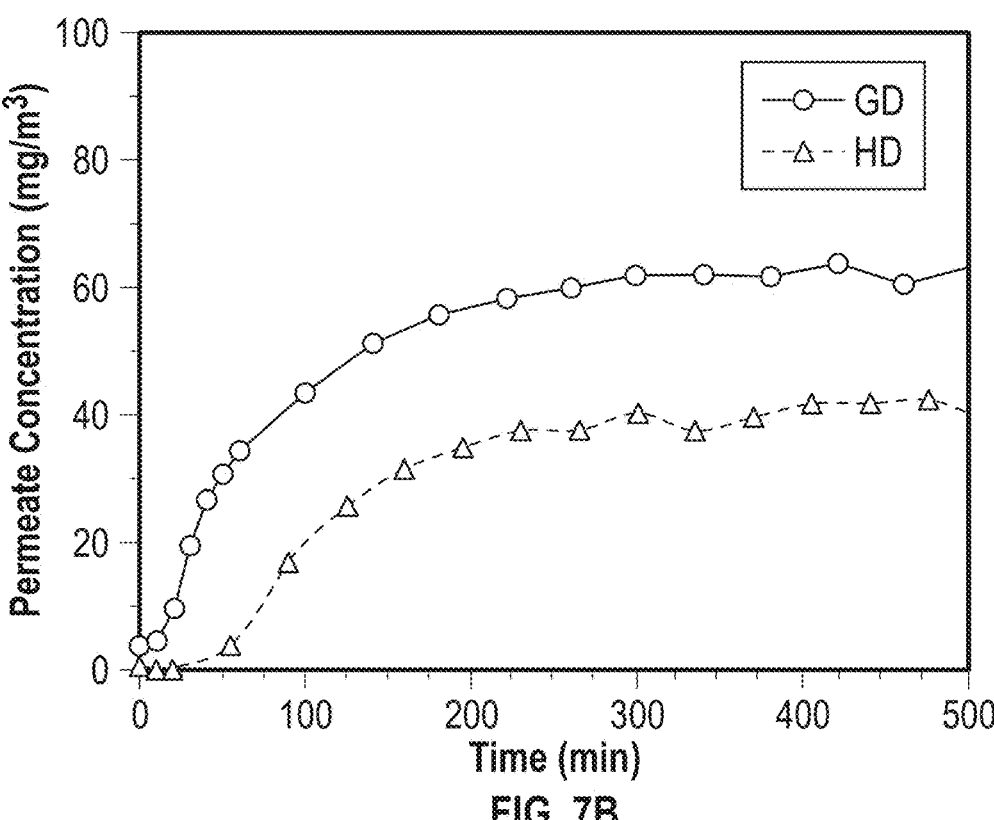
FIG. 7B is a chart illustrating permeation results of CWAs, HD, and GD through only a MOF layer of a protective material.

Breakthrough studies of two CWAs—mustard gas (HD), $C_4H_8Cl_2S$, bis(2-chloroethyl) sulfide; organophosphorus nerve agent, Soman (GD), $C_7H_{16}FO_2P$, 3,3-Dimethylbutan- 2-yl methylphosphonofluoridate—were performed with the material 100. The blocking of a simulant for HD namely, 2-CEES, was studied earlier in separate investigations by small samples of GO membrane (see, e.g., Peng, C. et al., *Graphene oxide-based membrane as protective barrier against toxic vapors and gases*, ACS Appl. Mater. Interfaces. 2020, 12, 11094-11103), as well as by an earlier generation of UiO-66-NH₂ MOF-filled ePTFE membrane. (See, e.g., Song. Y. et al., *Membrane-supported metal organic framework based nanopacked bed for protection against toxic vapors*, Separation and Purification Technology. 2020, 251, 117406). Permeation test results of the nerve agent Soman (GD) and mustard gas (HD) in cross flow are provided in FIGS. 7A-7B. In particular, FIG. 7A is a chart illustrating individual permeation result through one layer of a GO-membrane (90 mm) stacked on one layer of a MOF-filled ePTFE membrane ((wt. of MOF/wt. of MOF-filled membrane)=45%) for 300 mg/m³ Soman (GD) and Mustard gas (HD) containing gas streams. FIG. 7B is a chart illustrating individual agent permeation results through only the MOF layer of the multilayer structure used for the test of FIG. 7A.

FIG. 7A provides a window into how the multilayer membrane structure blocks the real CWAs instead of the simulant(s). The multilayered membrane having one GO membrane layer on top of a MOF-filled ePTFE membrane layer (wt % of MOF in MOF-filled membrane, 45%), completely blocked HD for 1075 min. The experiment was not extended beyond this time. In previous studies, a breakthrough concentration of 12 mg/m³ of 2-CEES (a HD simulant) through a MOF-filled ePTFE membrane (67% MOF filled) on the permeate side per ASTM F 739-12 when exposed in a cross-flow setup of Peske PTF 700 permeation cell with a feed CEES concentration at 300 mg/m³ was reported, and 2-CEES was blocked completely for 46.4 min. (See, e.g., Song, Y. et al., *Membrane-supported metal organic framework based nanopacked bed for protection against toxic vapors*, Separation and Purification Technology. 2020, 251, 117406). In the present study, the individual GO-based membrane completely blocked 2-CEES for only 16 min but limited the plateau concentration of CEES to a very low value of approximately 0.25 mg/m³ for a long period of time. (See, e.g., Peng, C. et al., *Graphene oxide-based membrane as protective barrier against toxic vapors and gases*, ACS Appl. Mater. Interfaces. 2020, 12, 11094-11103). This very low level of continuous leakage from the top GO layer was highly useful for the bottom MOF-filled layer to adsorb for an extended period of time.

The time for complete blockage of GD by the multilayer membrane was on the other hand 176 min (FIG. 7A). The breakthrough concentration for GD is a low value 1.2 mg/m³ under the same test condition and method used for HD. The agent transport data for the multilayer structure illustrating the behavior of FIG. 7A are provided in Tables 3 and 4 (below). For the results of Table 3, one layer of GO-membrane was stacked on one layer of MOF-filled ePTFE membrane ((weight of MOF/weight of MOF-filled membrane)=45%). A 300 mg/m³ Soman (GD) containing gas stream was used as the feed. For the results of Table 4, one layer of GO-membrane was stacked on one layer of MOF-filled ePTFE membrane ((weight of MOF/weight of MOF-filled membrane)=45%). A 300 mg/m³ mustard (HD) containing gas stream was used as the feed. The individual adsorption-breakthrough behaviors of the MOF-filled bottom membrane layer only for both HD and GD are illustrated in FIG. 7B. HD is almost fully blocked for about 20 min, and the breakthrough concentration value is about 42 mg/m³. However, GD is not fully blocked by this MOF for a long period of time. The breakthrough value for GD is about 62 mg/m³. The higher breakthrough value for GD is due to a higher feed agent concentration of about 375 mg/m³. The agent transport data for the MOF layer only are provided in Tables 5 and 6 (below). For the results of Table 5, the weight of MOF/weight of MOF-filled membrane=45%, and a 375-300 mg/m³ Soman (GD) containing gas stream was used as the feed. For the results of Table 6, the weight of MOF/weight of MOF-filled membrane=45%, and a 300 mg/m³ mustard (HD) containing gas stream was used as the feed.

TABLE 3

Nerve agent Soman (GD) permeation tests
in cross-flow for multilayered membrane

| | | Concentration of GD | |
| --- | --- | --- | --- |
| Time min | Feed In mg/m³ | Feed Out mg/m³ | Product mg/m³ |
| 0.5 | 276.4229 | 266.5153 | 0 |
| 15.5 | 302.9122 | 283.9868 | 0 |
| 55.51 | 301.6755 | 287.5159 | 0 |
| 95.51 | 305.0665 | 288.3873 | 0 |
| 135.51 | 301.7553 | 288.2566 | 0 |
| 175.51 | 303.4707 | 289.7379 | 0 |
| 215.52 | 302.4734 | 288.8665 | 0.400266 |
| 255.52 | 302.9122 | 289.4765 | 0.511968 |
| 295.52 | 300 | 289.2587 | 0.651596 |
| 335.52 | 303.2713 | 289.0844 | 0.744681 |
| 375.53 | 301.4362 | 288.6923 | 0.744681 |
| 415.53 | 303.391 | 289.6944 | 0.837766 |
| 455.53 | 299.8005 | 288.518 | 0.930851 |
| 495.54 | 301.5559 | 289.5201 | 0.930851 |
| 535.54 | 300.2394 | 289.8686 | 0.930851 |
| 575.54 | 299.9601 | 289.3022 | 0.977394 |
| 615.55 | 302.4335 | 289.1715 | 1.210106 |
| 655.55 | 298.6436 | 288.6487 | 1.210106 |
| 695.55 | 300.4388 | 288.3437 | 1.210106 |
| 735.55 | 298.125 | 288.7358 | 1.210106 |
| 775.55 | 300.0399 | 288.9101 | 1.210106 |
| 815.56 | 299.2819 | 288.6923 | 1.256649 |
| 855.56 | 300 | 288.8665 | 1.303191 |
| 895.56 | 298.883 | 288.3437 | 1.349734 |
| 935.56 | 302.0745 | 289.433 | 1.349734 |
| 975.56 | 298.6037 | 288.1694 | 1.303191 |

TABLE 4

Sulfur mustard (HD) permeation in cross
flow for multilayered membrane

| | | Concentration of HD | |
| --- | --- | --- | --- |
| Time min | Feed In mg/m³ | Feed Out mg/m³ | Product mg/m³ |
| 0 | 288.878 | 294.2424 | 0 |
| 19.8 | 288.878 | 294.2424 | 0 |
| 39.81 | 289.9756 | 302.7273 | 0 |
| 59.81 | 287.8537 | 307.1212 | 0 |
| 104.81 | 305.6341 | 317.197 | 0 |
| 149.81 | 270.2927 | 287.2727 | 0 |
| 194.82 | 298.1707 | 321.6667 | 0 |
| 239.82 | 294.0732 | 304.8485 | 0 |
| 284.82 | 283.0244 | 283.7879 | 0 |
| 329.82 | 301.1707 | 313.3333 | 0 |
| 374.82 | 284.8537 | 301.1364 | 0 |
| 419.83 | 298.3171 | 297.1212 | 0 |
| 464.83 | 302.0488 | 315 | 0 |
| 509.83 | 273.878 | 297.2727 | 0 |
| 554.83 | 304.3171 | 328.7121 | 0 |
| 599.84 | 300.0732 | 318.8636 | 0 |
| 644.84 | 289.9024 | 304.697 | 0 |

TABLE 4-continued

Sulfur mustard (HD) permeation in cross flow for multilayered membrane

| | Concentration of HD | | |
| Time min | Feed In mg/m³ | Feed Out mg/m³ | Product mg/m³ |
|---|---|---|---|
| 689.84 | 292.0976 | 310.9848 | 0 |
| 734.84 | 274.1707 | 298.5606 | 0 |
| 779.84 | 277.7561 | 299.697 | 0 |
| 824.85 | 269.7073 | 283.9394 | 0 |
| 869.85 | 316.9024 | 340.3788 | 0 |
| 914.85 | 1.317073 | 327.4242 | 0 |
| 934.85 | 0.804878 | 329.2424 | 0 |
| 954.86 | 0.658537 | 329.4697 | 0 |
| 974.86 | 0.512195 | 331.2121 | 0 |
| 994.86 | 0.365854 | 330.9848 | 0 |
| 1014.86 | 0.439024 | 329.3939 | 0 |
| 1034.86 | 0.365854 | 333.4848 | 0 |
| 1054.87 | 298.5366 | 310.1515 | 0 |
| 1074.87 | 294.5854 | 317.4242 | 0 |

TABLE 5

Nerve agent Soman (GD) permeation tests in cross flow over one layer of MOF-filled ePTFE membrane

| | Concentration of GD | | |
| Time min | Feed In mg/m³ | Feed Out mg/m³ | Product mg/m³ |
|---|---|---|---|
| 0.75 | 427.56 | 209.80 | 3.90 |
| 10.76 | 374.70 | 207.08 | 4.45 |
| 20.76 | 356.48 | 215.29 | 9.46 |
| 30.76 | 349.79 | 222.35 | 19.41 |
| 40.77 | 344.18 | 220.90 | 26.67 |
| 50.77 | 343.65 | 230.22 | 30.52 |
| 60.77 | 335.09 | 226.00 | 34.04 |
| 100.77 | 326.45 | 235.92 | 43.50 |
| 140.77 | 318.37 | 239.74 | 51.20 |
| 180.78 | 312.91 | 235.11 | 55.71 |
| 220.78 | 307.86 | 230.94 | 58.18 |
| 260.78 | 301.91 | 223.62 | 59.94 |
| 300.78 | 307.00 | 231.49 | 61.92 |
| 340.79 | 299.81 | 231.02 | 61.92 |
| 380.79 | 301.38 | 224.56 | 61.75 |
| 420.79 | 304.38 | 232.05 | 63.79 |
| 460.79 | 290.31 | 227.54 | 60.60 |
| 500.80 | 301.08 | 232.47 | 63.18 |
| 540.80 | 299.29 | 229.28 | 63.13 |
| 580.80 | 300.71 | 229.88 | 62.36 |
| 620.80 | 299.74 | 230.51 | 63.40 |
| 660.81 | 299.21 | 231.58 | 64.01 |
| 700.81 | 299.74 | 230.94 | 63.46 |
| 740.81 | 299.96 | 229.11 | 63.29 |
| 780.81 | 298.73 | 231.41 | 64.23 |
| 820.82 | 298.13 | 226.52 | 62.41 |
| 860.82 | 298.35 | 227.79 | 62.69 |
| 900.82 | 304.83 | 231.41 | 64.01 |
| 940.82 | 298.24 | 228.56 | 63.90 |

TABLE 6

Sulfur mustard (HD) permeation tests in cross flow over one layer of MOF-filled ePTFE membrane

| | Concentration of HD | | |
| Time min | Feed In mg/m³ | Feed Out mg/m³ | Product mg/m³ |
|---|---|---|---|
| 0.16 | 1.54 | 80.96 | 0.37 |
| 10.16 | 270.22 | 156.85 | 0.29 |

TABLE 6-continued

Sulfur mustard (HD) permeation tests in cross flow over one layer of MOF-filled ePTFE membrane

| | Concentration of HD | | |
| Time min | Feed In mg/m³ | Feed Out mg/m³ | Product mg/m³ |
|---|---|---|---|
| 20.17 | 286.80 | 166.63 | 0.22 |
| 55.17 | 293.77 | 181.90 | 3.67 |
| 90.17 | 296.19 | 196.40 | 16.58 |
| 125.17 | 286.28 | 205.75 | 25.67 |
| 160.18 | 298.39 | 216.32 | 31.32 |
| 195.18 | 288.19 | 216.96 | 34.69 |
| 230.18 | 300.81 | 229.09 | 37.56 |
| 265.18 | 291.27 | 220.67 | 37.33 |
| 300.19 | 308.73 | 237.80 | 40.20 |
| 335.19 | 281.96 | 221.38 | 37.41 |
| 370.19 | 296.48 | 235.38 | 39.39 |
| 405.19 | 292.37 | 237.30 | 41.52 |
| 440.20 | 303.96 | 238.09 | 41.74 |
| 475.20 | 305.65 | 240.87 | 42.25 |
| 510.20 | 289.88 | 233.38 | 40.42 |
| 545.20 | 294.57 | 239.02 | 42.32 |
| 580.20 | 299.12 | 241.09 | 42.47 |
| 615.21 | 299.85 | 241.30 | 42.76 |
| 650.21 | 300.51 | 239.23 | 42.84 |
| 685.21 | 302.27 | 240.73 | 42.47 |
| 720.21 | 296.19 | 235.95 | 41.88 |
| 755.22 | 295.31 | 236.88 | 41.88 |
| 790.22 | 294.35 | 240.23 | 42.69 |
| 825.22 | 301.76 | 242.66 | 42.98 |
| 860.22 | 302.20 | 246.09 | 43.72 |
| 895.23 | 304.11 | 243.37 | 43.35 |
| 930.23 | 294.43 | 242.80 | 42.62 |
| 965.23 | 46.06 | 290.06 | 0.00 |
| 985.23 | 47.82 | 286.56 | 0.00 |
| 1005.24 | 45.99 | 286.35 | 0.00 |
| 1025.24 | 46.06 | 289.35 | 0.00 |
| 1045.24 | 48.56 | 295.63 | 0.00 |
| 1065.24 | 44.82 | 291.20 | 0.00 |
| 1085.25 | 47.38 | 297.56 | 0.00 |

Figure 8A:
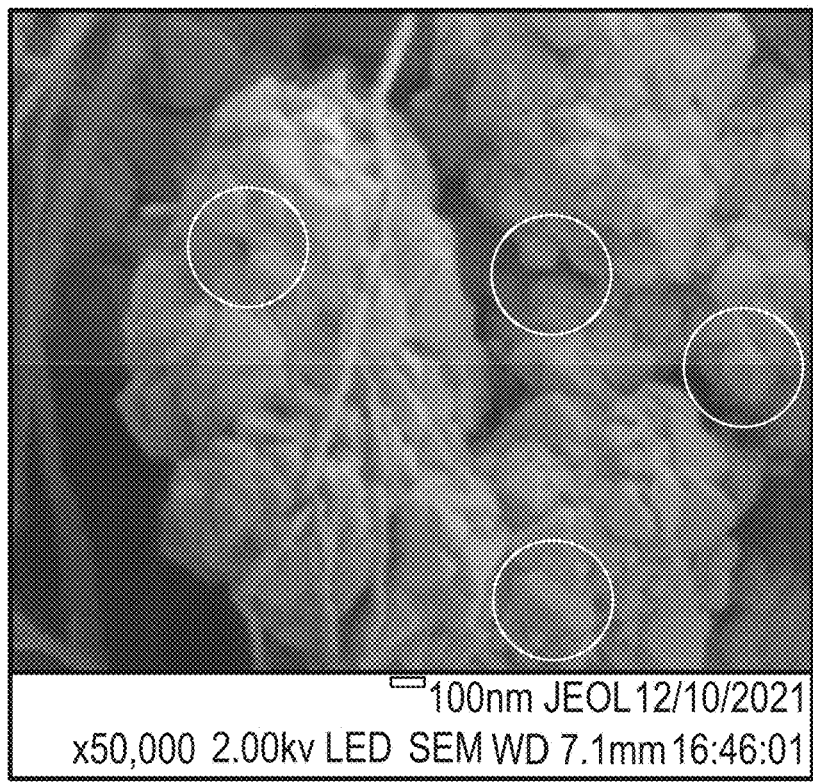
FIG. 8A is a scanning electron micrograph (SEM image for MOF nanocrystals in the openings/pores of an ePTFE membrane.
Figure 8B:
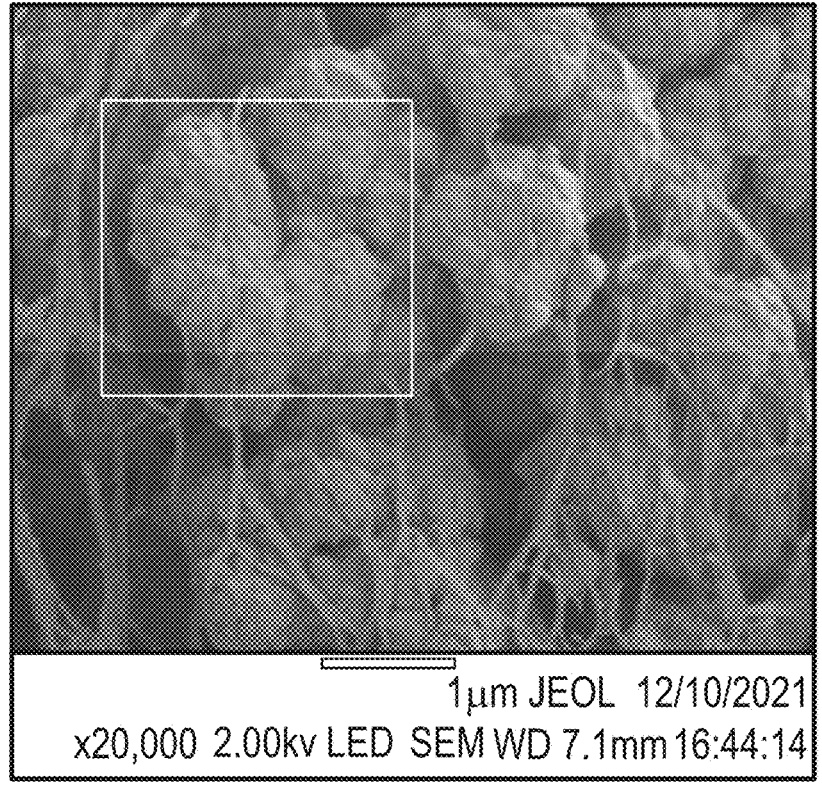
FIG. 8B is an SEM image showing a profusion of MOF nanocrystal aggregates in ePTFE membrane openings/pores.
Figure 8C:
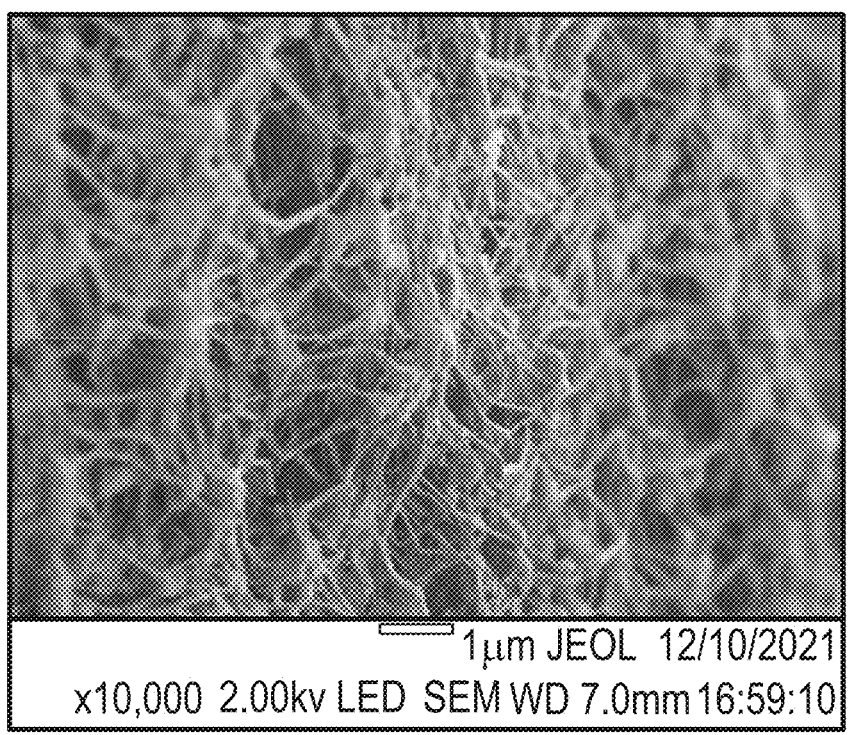
FIG. 8C is an SEM image of an ePTFE membrane showing its microfibrillar structure.
Figure 8D:
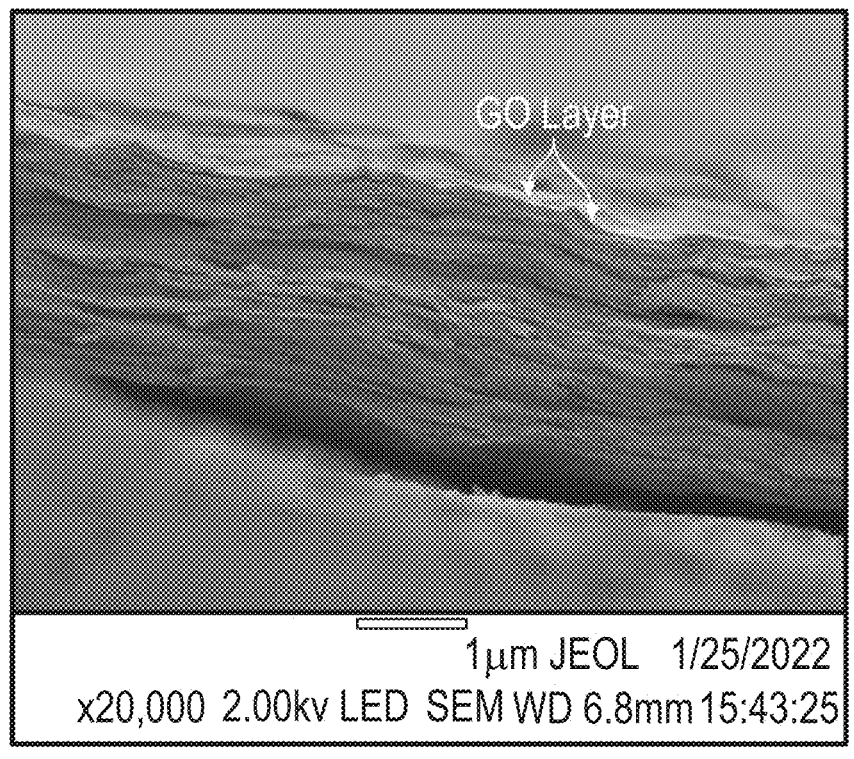
FIG. 8D is an SEM image of a cross-section of a GO layer deposited on a PES substrate.

FIGS. 8A-8D are scanning electron micrograph (SEM) images of the cross-section of the ePTFE membranes where MOF nanocrystals were developed solvothermally inside the interfibrillar space of the ePTFE membrane located below the GO laminate membrane. The cross-section of the GO laminate membrane is also depicted. In particular, FIGS. 8A-8D show membrane cross-section SEMs for MOF nanocrystals in ePTFE membrane interfibrillar space and an SEM showing the GO laminate membrane thickness. FIG. 8A shows the SEM of MOF nanocrystals in the openings/pores of ePTFE membrane, FIG. 8B shows the SEM illustrating a profusion of MOF nanocrystal aggregates in ePTFE membrane openings/pores, FIG. 8C shows the SEM of the ePTFE membrane showing its microfibrillar structure, and FIG. 8D shows the SEM of the cross-section of the GO layer deposited on the PES substrate. The GO layer thickness was about 3 μm (32 mg of GO used with large size PES substrate membrane).

Figure 9:
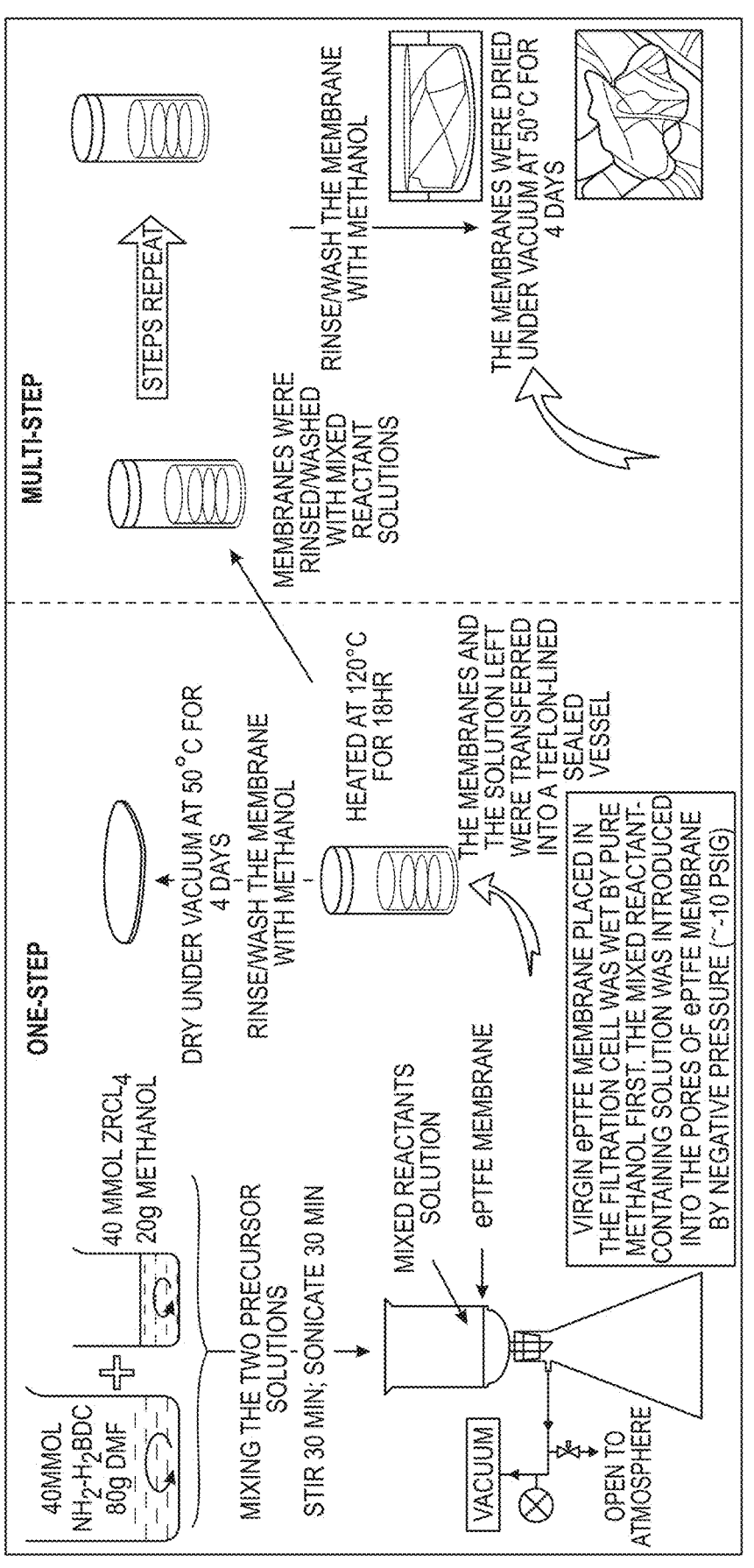
FIG. 9 is a diagrammatic view of a multistep process for obtaining an ePTFE membrane whose pores are filled with in situ synthesized nanocrystals of MOF.
Figure 10:
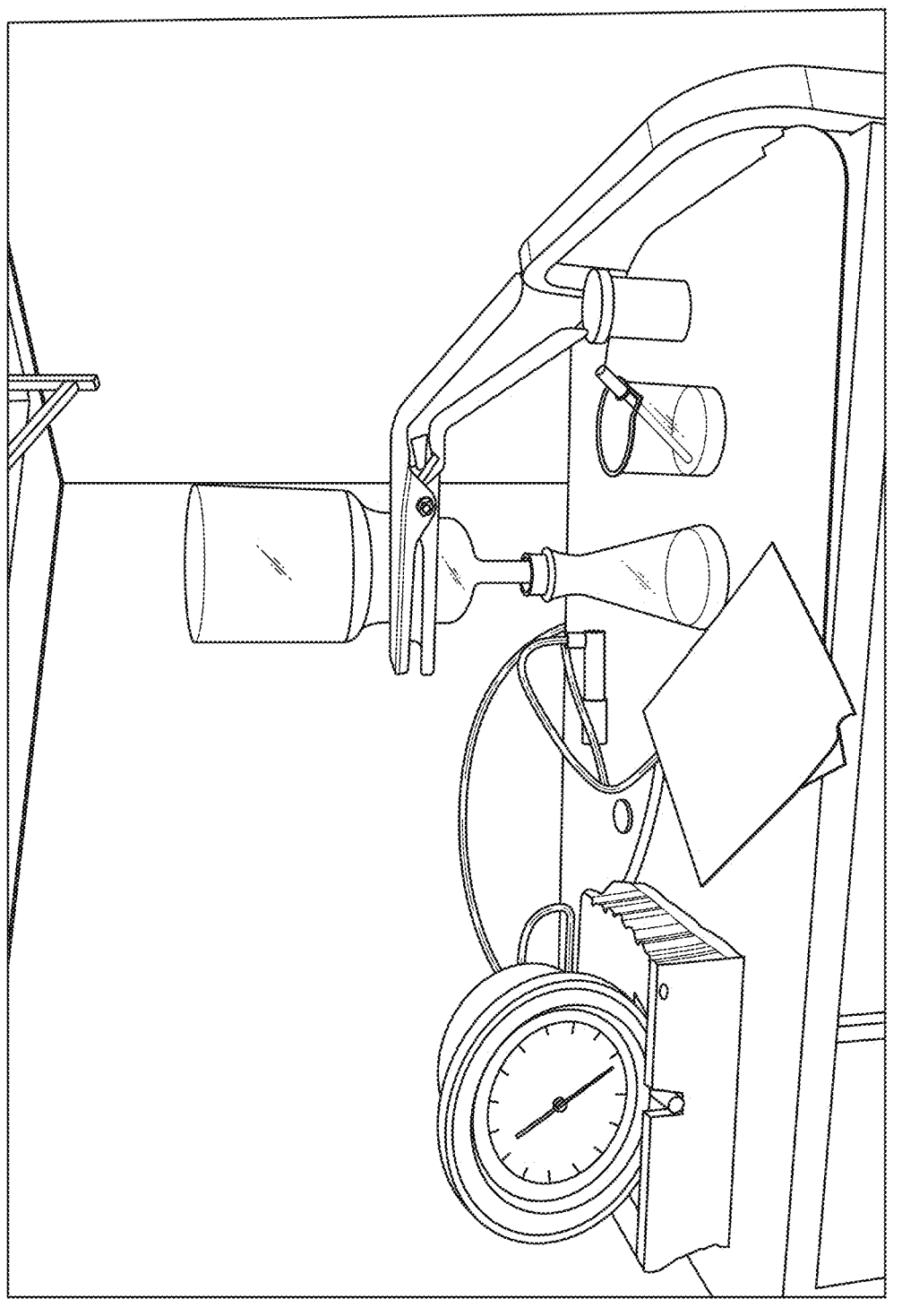
FIG. 10 is an image of an experimental setup for introducing mixed reactant-containing solution into a microporous ePTFE membrane with assistance of vacuum.

The SEM of FIG. 8A illustrates the dense growth of nanocrystals of MOF UiO-66-NH$_2$ inside and around the fibrillar structure of the ePTFE membrane. This growth was achieved by synthesis carried out three times (See, e.g., FIGS. 9 and 10) on the same piece of membrane with additional crystal growth taking place each time after the first synthesis step. As illustrated in FIG. 9, for one step, 40 mmol of NH$_2$-H$_2$BDC and 80 g DMF were mixed together, and 40 mmol ZrCl$_4$ and 20 g Methanol was mixed together in separate beakers. These were subsequently mixed together as two precursor solutions, stirring for 30 minutes, and sonicating for 30 minutes. Mixed reactant solution was added to the ePTFE membrane in a testing container connected to vacuum with a valve open to atmosphere. Virgin ePTFE membrane was placed in the filtration cell and was wet by pure methanol first. The mixed reactant-containing solution was introduced into the pores of the ePTFE membrane by negative pressure (about −10 psig). The membranes and the solution left were transferred into a Teflon-lined sealed vessel. The vessel was heated at 120° C. for about 18 hours. The membrane was rinsed/washed with methanol and dried under vacuum at 50° C. for 4 days. As further illustrated in FIG. 9, the multi-step process involved rinsing/washing the membranes with the mixed reactant solution. The steps were repeated, and the membranes were rinsed/washed with methanol. The membranes were subsequently dried under vacuum at 50° C. for 4 days. FIG. 10 is a photograph of the experimental setup described in FIG. 9.

Figure 11A:
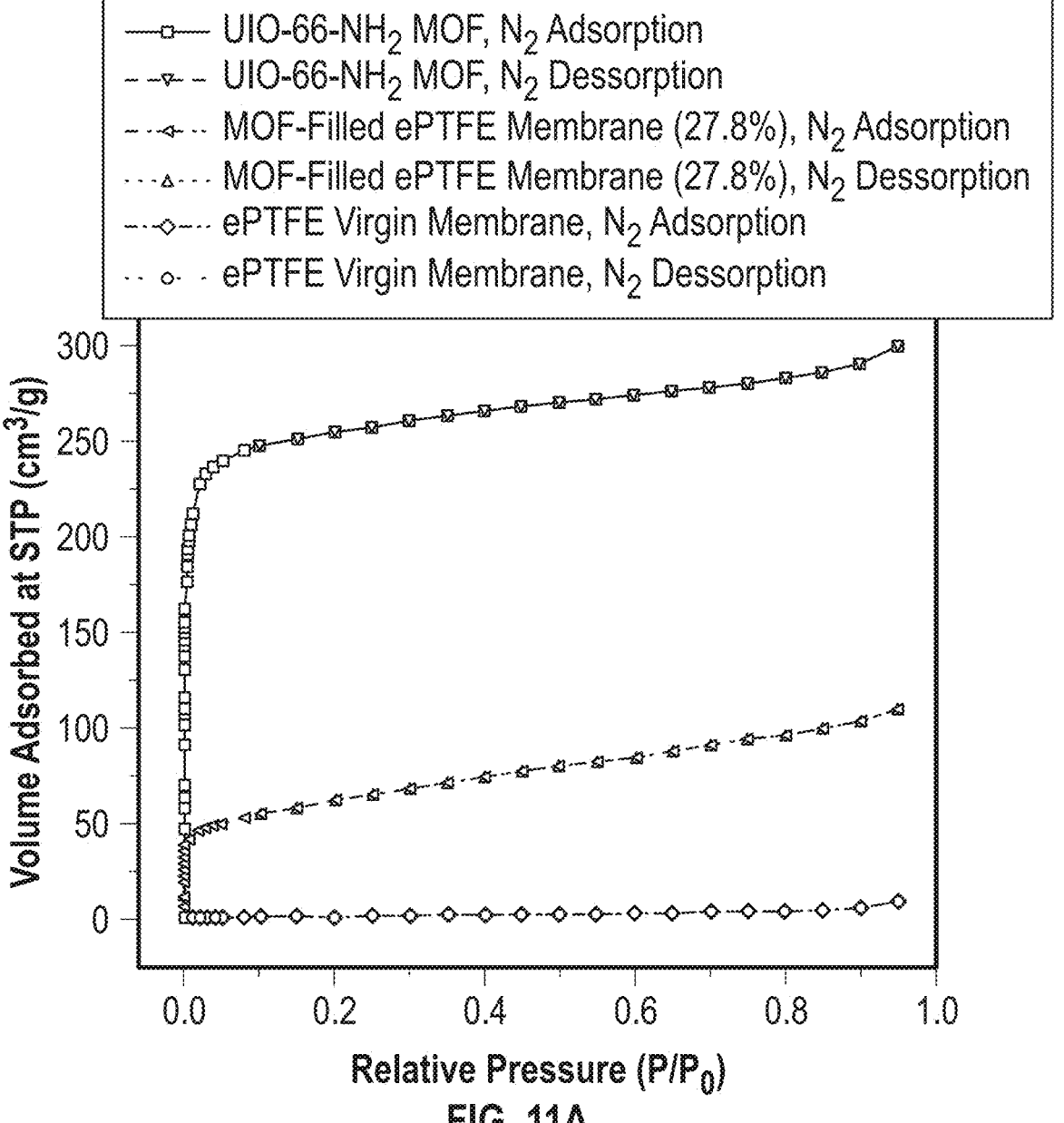
FIG. 11A is a chart showing BET isotherms of virgin ePTFE membrane, ePTFE membrane filled with MOF, UiO-66-$NH_2$, and only MOF UiO-66-$NH_2$.
Figure 11B:
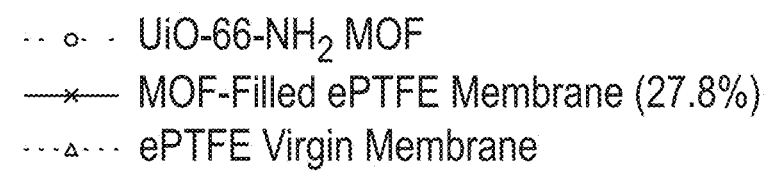
FIG. 11B is a chart showing pore size distribution of all samples in FIG. 11A.
Figure 11B:
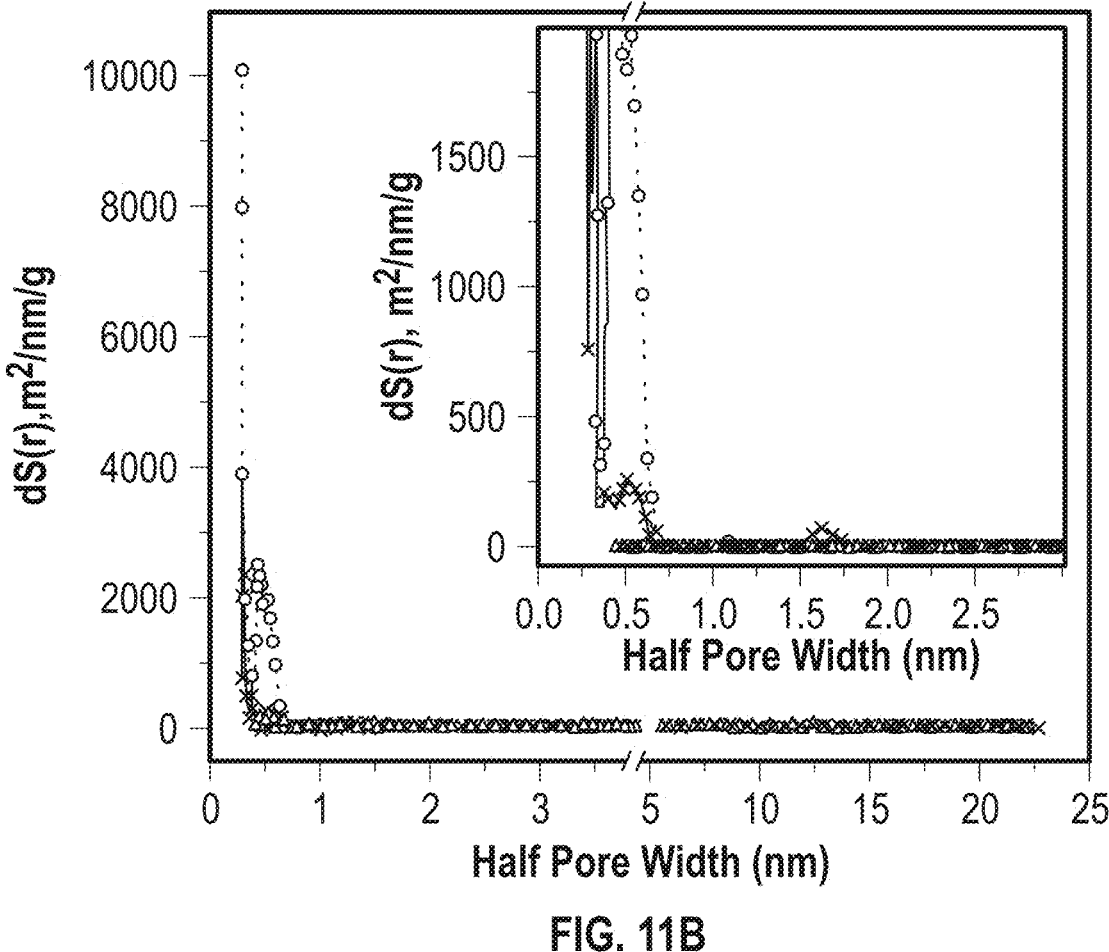
Figure 12A:
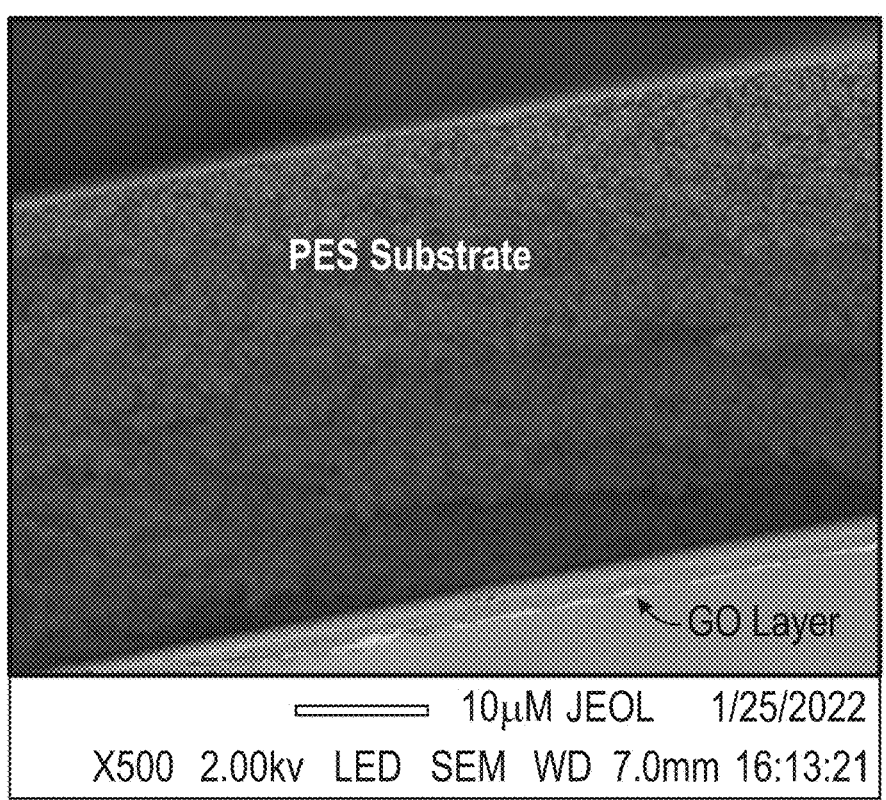
FIG. 12A is an SEM cross-sectional photo of the GO layer deposited on the PES substrate, with low magnification-based overview of the GO-PES membrane (32 mg of GO used with large size PES substrate membrane.
Figure 12B:
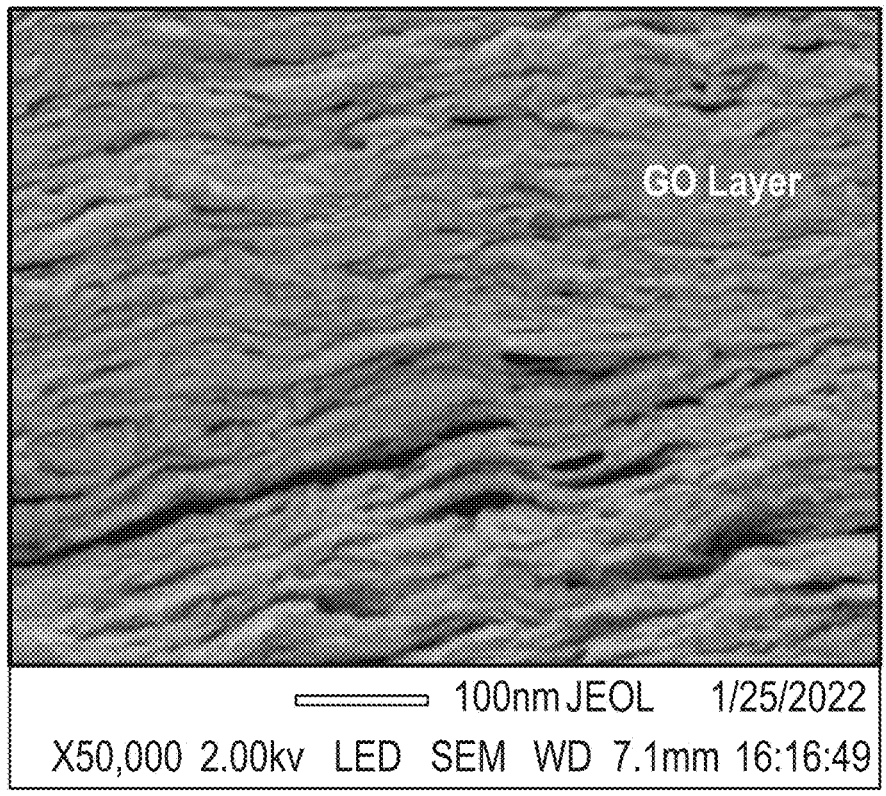
FIG. 12B is an SEM cross-sectional photo of FIG. 12A with a 50 k magnification view of the GO layer.

The crystals (identified by red circles in FIG. 8A) have dimensions of about 100-200 nm. FIG. 8B shows the original SEM from whose marked top left-hand section, material was taken to develop FIG. 8A. FIG. 8C illustrates the fibrillar structure of the virgin 0.4 µm pore size ePTFE membrane inside whose structural openings MOF crystals were synthesized. The BET adsorption-desorption behavior and the pore size distribution of the MOF are provided in FIGS. 11A-11B, and the corresponding surface areas are provided in Table 7 (below). In particular, FIG. 11A is a chart showing BET isotherms of virgin ePTFE membrane, ePTFE membrane filled with MOF, UiO-66-NH$_2$, and only MOF UiO-66-NH$_2$, and FIG. 11B is a chart showing pore size distribution of all samples in FIG. 11A. Around 3 µm+ thickness of the laminated GO layer is visible in the SEM of FIG. 8D. A gap between the PES substrate and the bottom surface of the GO layer on top developed during sample preparation at a low temperature. Additional SEMs of the GO layer at ×50,000 magnification and the overall GO-PES support layer at a low ×500 magnification are provided in FIGS. 12A-12B. In particular, FIG. 12A is an SEM cross-sectional photo of the GO layer deposited on the PES substrate, with low magnification-based overview of the GO-PES membrane (32 mg of GO used with large size PES substrate membrane), and FIG. 12B is an SEM cross-sectional photo of FIG. 12A with a 50 k magnification view of the GO layer.

TABLE 7

| BET based surface area estimates | |
| --- | --- |
| Samples | Surface area (m$^2$/g) |
| UiO-66-NH$_2$ MOF | 984 |
| MOF-filled ePTFE membranes ((weight of MOF/weight of MOF-filled membrane) = 45%) | 381 |
| MOF-filled ePTFE membranes ((weight of MOF/weight of MOF-filled membrane) = 27.8%) | 216 |
| Virgin ePTFE membrane | 5.7 |

Figure 13A:
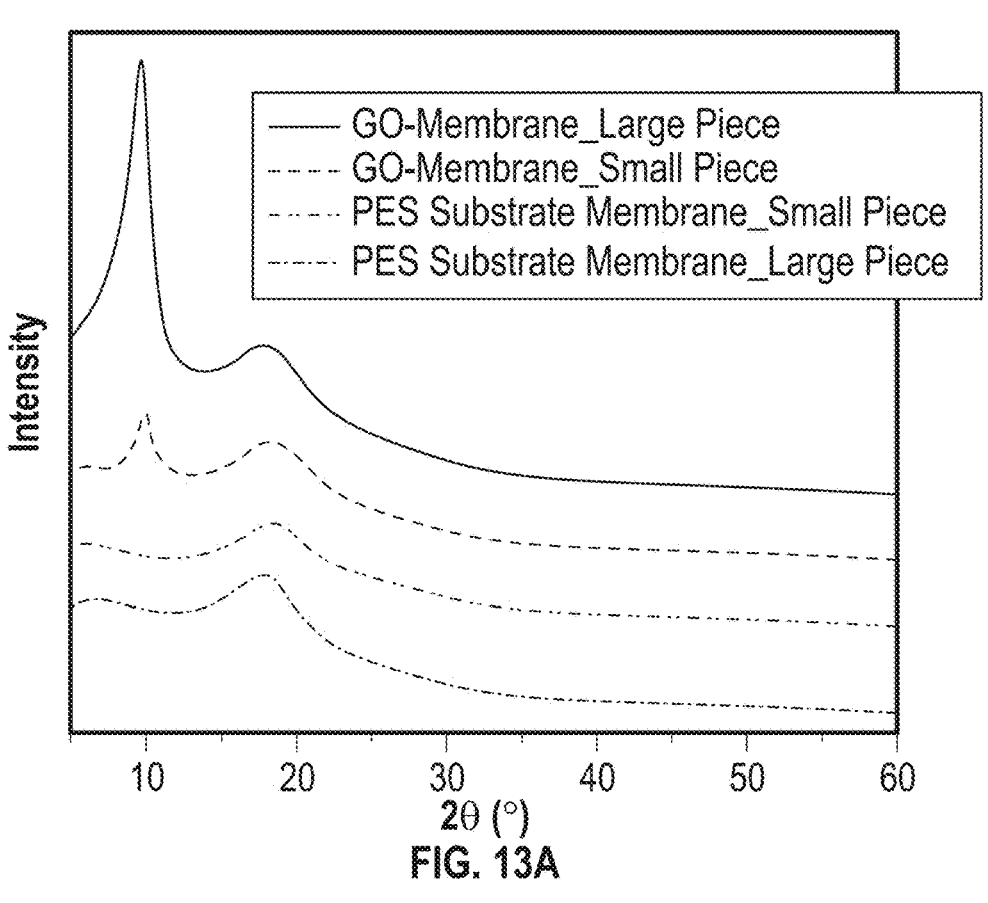
FIG. 13A is a chart showing PXRD scans of individual components of the multilayer GO-MOF structure, including XRD scans of a 32 mg GO-based membrane on a PES substrate (large piece, diameter about 8 cm), an 8 mg GO-based membrane on a PES substrate (small piece, diameter about 4 cm), and the corresponding PES substrate membranes.
Figure 13B:
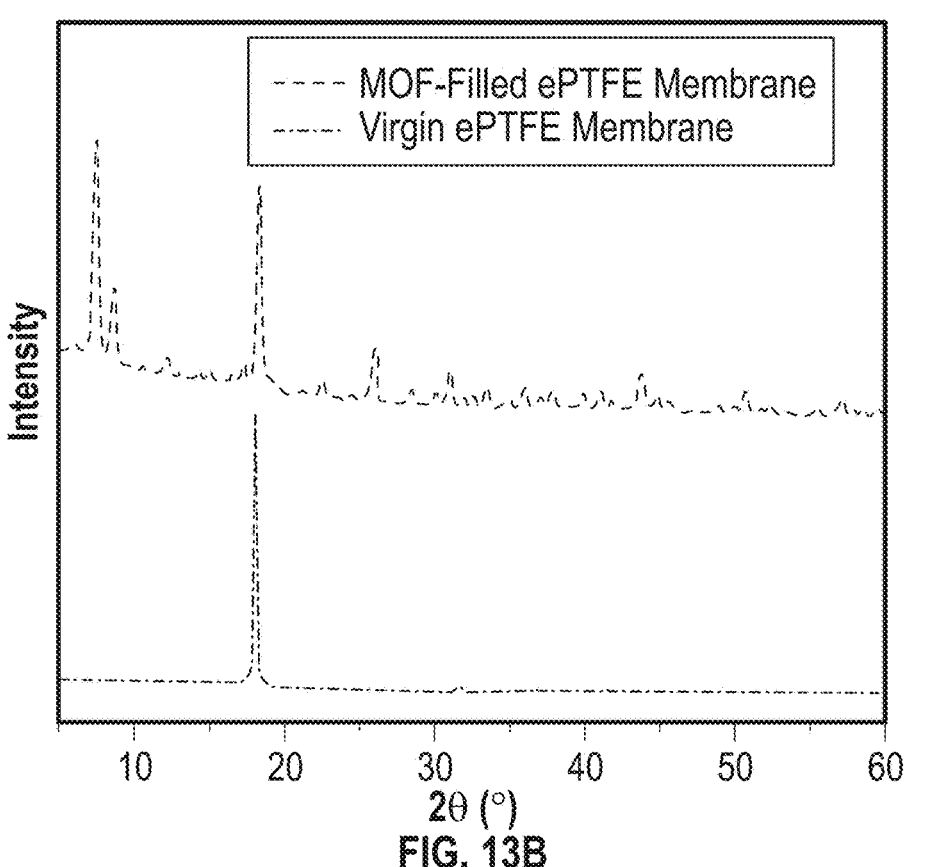
FIG. 13B is a chart showing PXRD scans of individual components of the multilayer GO-MOF structure, including XRD scans of UiO-66-$NH_2$ MOF-filled ePTFE membrane ((MOF/MOF-filled membrane)=45%, w/w) and virgin ePTFE membrane.
Figure 13C:
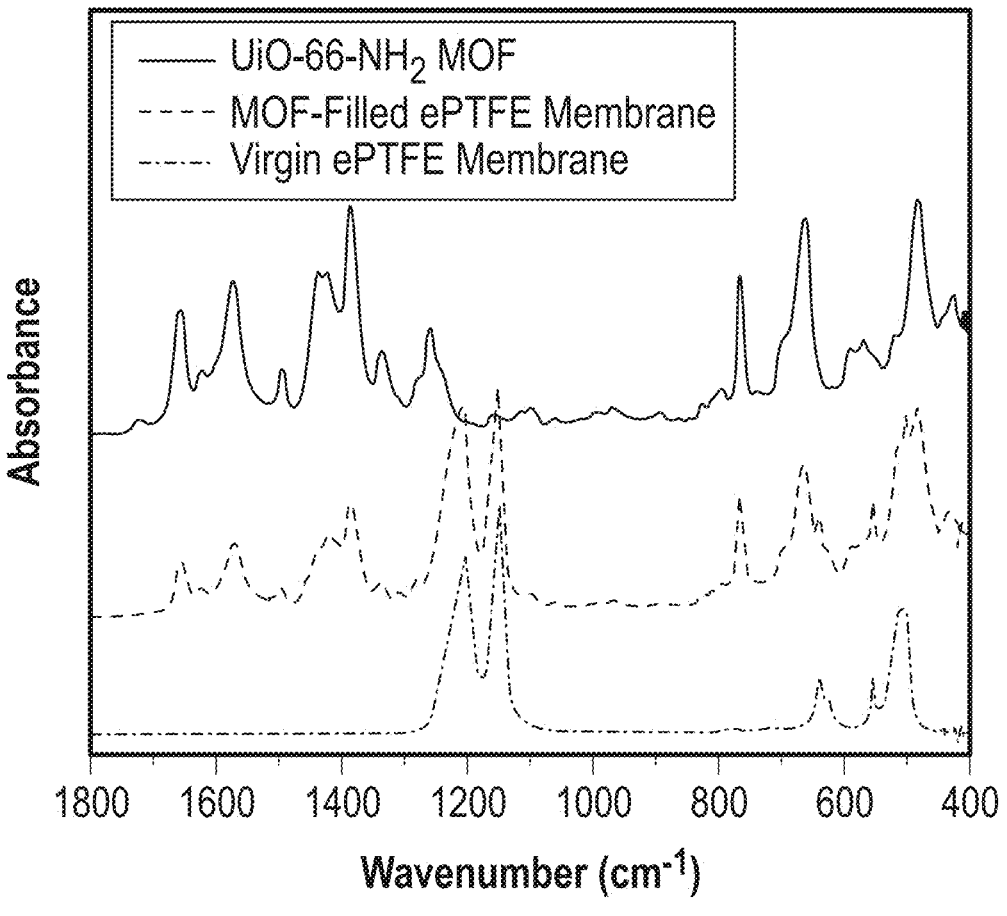
FIG. 13C is a chart showing FTIR spectra of individual components of the multilayer GO-MOF structure, including FTIR absorption spectra in 1800 to 400 $cm^{-1}$ range of the UiO-66-$NH_2$ MOF; UiO-66-$NH_2$ MOF-filled ePTFE membrane; and virgin ePTFE membrane.

FIGS. 13A-13C are charts of PXRD scans and FTIR spectra of individual components of the multilayer GO-MOF structure. In particular, FIG. 13A shows XRD scans of a 32 mg GO-based membrane on a PES substrate (large piece, diameter about 8 cm), an 8 mg GO-based membrane on a PES substrate (small piece, diameter about 4 cm), and the corresponding PES substrate membranes. FIG. 13B shows XRD scans of UiO-66-NH$_2$ MOF-filled ePTFE membrane ((MOF/MOF-filled membrane)=45%, w/w) and virgin ePTFE membrane. FIG. 13C shows FTIR absorption spectra in 1800 to 400 cm$^{-1}$ range of the UiO-66-NH$_2$ MOF;

UiO-66-NH$_2$ MOF-filled ePTFE membrane; and virgin ePTFE membrane. FIGS. 13A-13C present the results of characterizations of the material structures employed in the two individual layers of the multilayer membrane via XRD and FTIR. The XRD patterns of the GO membrane (without PU coating) and the PES support membrane for both larger and smaller sizes are illustrated in FIG. 13A. For the larger size membranes prepared using 32 mg GO, d-spacing calculation for the GO laminate, based on the first peak located at 9.7° (2θ) is 9.1 Å. There is another smaller peak at 17.7° corresponding to a d-spacing of 5 Å. For the 8 mg-based smaller size GO-membrane, the peak at 10.0° (2θ) leads to a d-spacing of 8.8 Å. There is another peak at 18.2° leading to a d-spacing of 4.9 Å. Since the 32 mg amount reflects a proportionate increase from 8 mg due to a larger size porous membrane substrate, variation between the 32 mg and 8 mg membranes is not expected in terms of the XRD pattern. The substrate PES shows a broad peak around 18° as well, which also appears in the patterns for the GO laminates.

The XRD patterns of the MOF-filled ePTFE membrane illustrated in FIG. 13B show two peaks at 2θ values of 7.6 and 8.73 which yield d-spacings of 11.6 Å and 10.1 Å, respectively. These peaks of the MOF, UiO-66-NH$_2$, have been identified in literature. (See, e.g., Cavka, J. H. et al., *A new zirconium inorganic building brick forming metal organic frameworks with exceptional stability*, J. Am. Chem. Soc. 2008, 130, 13850-13851; Kandiah, M. et al., *Synthesis and stability of tagged UiO-66 Zr-MOFs*. Chem. of Mater. 2010, 22, 6632-6640). FIG. 13C shows the FTIR spectra of a virgin ePTFE membrane employed to support MOF nanocrystals in the interfibrillar space of an ePTFE membrane along with those of a membrane supporting the MOF nanocrystals. The difference between the two match clearly with the spectra shown also of the solvothermally synthe-sized MOF crystals investigated previously. (See, e.g., Song, Y. et al., *Membrane-supported metal organic framework based nanopacked bed for protection against toxic vapors*, Separation and Purification Technology. 2020, 251, 117406).

In the multilayered structure (i.e., the material 100) of a GO laminate-based membrane at the top exposed to the toxic gas mixture and backed up by a porous membrane-supported MOF, UiO-66-NH$_2$, forming a nano-packed bed at the bottom/permeate side, the top layer acts as a highly water vapor selective membrane drastically reducing the permeation rate of toxic vapors and gases having larger kinetic diameters. The bottom layer acts as a highly moisture permeable nano-packed bed with a high sorption capacity to drastically enhance the time needed for the low level of toxic vapors/gases leaking through the top layer to show up at the other end of the structure. Whereas there are existing multilayer structures using GO for mainly mechanical/support perspectives (see, e.g., Peng, C. et al., *Graphene oxide-based membrane as protective barrier against toxic vapors and gases*, ACS Appl. Mater. Interfaces. 2020, 12, 11094-11103; Steinberg, R. S. et al., *Breathable Vapor Toxicant Barriers Based on Multilayer Graphene Oxide*, ACS Nano. 2017, 11, 5670-5679) and/or for clothing (see, e.g., Lomax, G. R., *Breathable polyurethane membranes for textile and related industries*. J. Mater. Chem. 2007, 17, 2775-2784), the two layers of the material 100 have two altogether separate functions from CWA sorption/transport considerations.

For exemplary purposes, the barrier performances of the multilayer structure for four toxic penetrants are emphasized herein. However, based on the experimentation results, it should be understood that the multilayered protective material can be used for other toxic penetrants as well. During experimentation, the barrier blocked $NH_3$, HD, GD and a Sarin simulant, DMMP, completely for 2750 min, 1075 min. 176 min, and 7 days, respectively. The experimental results with a top laminated GO layer supported at the bottom by a layer of nanocrystals of a suitable MOF adsorbent in generally sub-micrometer interfibrillar space of a support membrane establish the concept of a highly moisture-permeable barrier that can block toxic vapors, CWAs, and the like, for an extended period of time. A single membrane or barrier that is moisture permeable and also blocks other toxic gases/vapors for an extended period of time is not available. It is not sufficient or satisfactory to develop 98-99%+ rejection of toxic gases and vapors in personal protection equipment, which some approaches such as a GO laminate based membrane (see, e.g., Peng, C. et al., *Graphene oxide-based membrane as protective barrier against toxic vapors and gases*, ACS Appl. Mater. Interfaces. 2020, 12, 11094-11103) or a collapsible polymer at the mouth of a CNT (see, e.g., Li Y. et al., *Autonomously responsive membranes for chemical warfare protection*, Advanced Functional Materials. 2020, 30, 2000258) were designed to achieve. Complete shut-out is needed for an extended period of time. Therefore, such membranes/barriers generally require serial reinforcement with an adsorbent layer that is highly efficient via a porous membrane supported MOF nanocrystals. Correspondingly, other barriers (see, e.g., Li Y. et al., *Autonomously responsive membranes for chemical warfare protection*, Advanced Functional Materials. 2020, 30, 2000258) may be used as the top layer instead of a GO layer (see, e.g., Peng, C. et al., *Graphene oxide-based membrane as protective barrier against toxic vapors and gases*, ACS Appl. Mater. Interfaces. 2020, 12, 11094-11103), and achieve the purpose of a successful barrier membrane. In some embodiments, the components of the material 100 may be selected to act as a barrier permeable to a specific vapor species and completely block other species regardless of their type.

Figure 16:
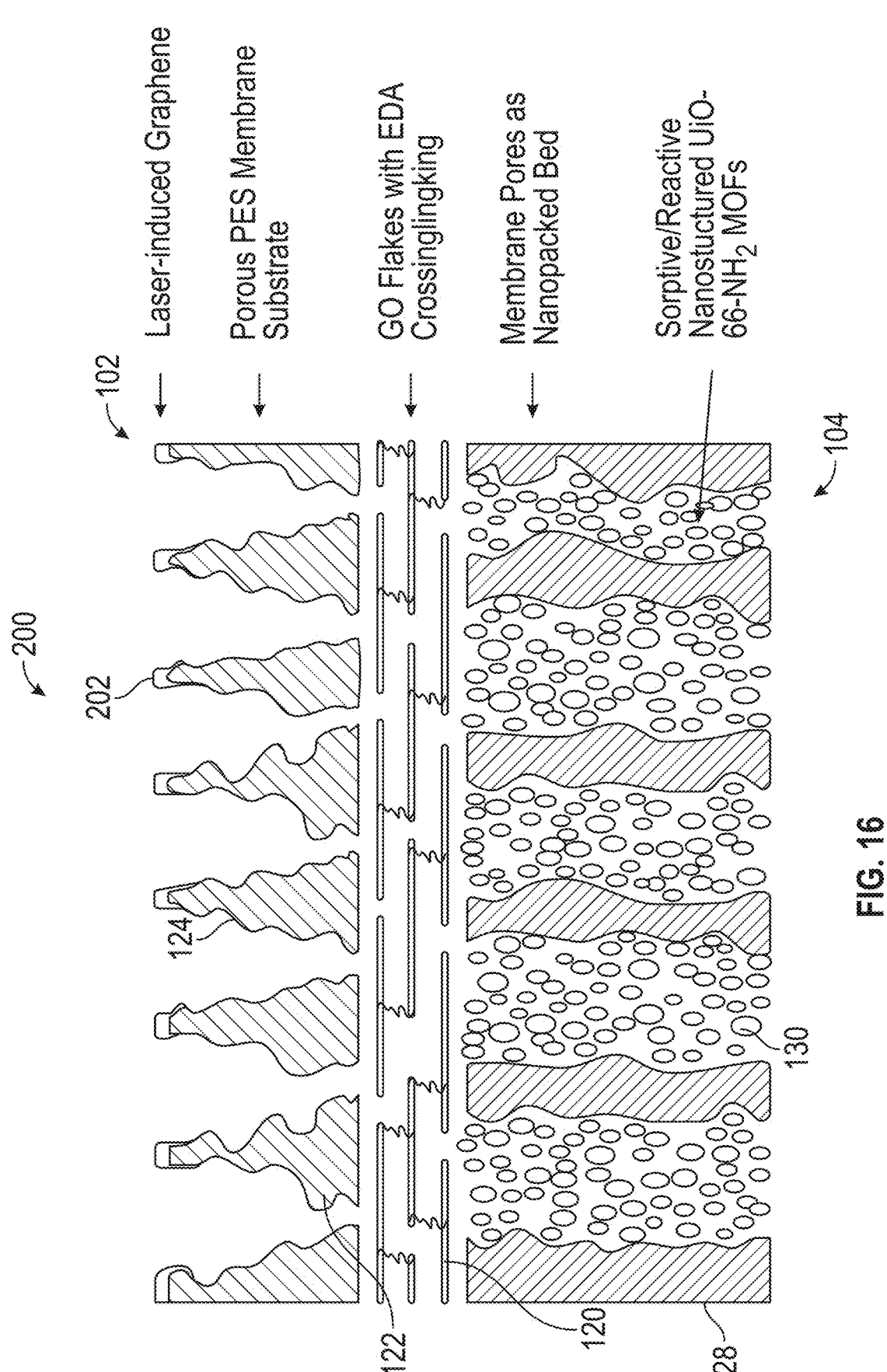
FIG. 16 is a diagrammatic cross-sectional view of another exemplary protective material in accordance with the present disclosure.

In some embodiments, the components of the material 100 may be selected to eliminate the porous PES membrane which supports the laminated GO layer and have the latter supported by the porous membrane layer housing the MOF nanocrystals. FIG. 16 illustrates a cross-sectional view of another protective material 200 in accordance with the present disclosure. In some embodiments, as illustrated in FIG. 16, the porous PES supported GO laminate membrane 120 can be flipped around by about 180° such that the GO layer/membrane 120 would be disposed directly above the porous membrane layer housing nanocrystals (membrane 128). In such embodiments, the porous PES membrane support 122 would be exposed to the feed gas mixture. In some embodiments, both GO and PES layers/membranes can be wetted by water. To create a superhydrophobic surface exposed to feed gas or an aerosol containing CWAs, the exposed porous PES membrane can be treated with a $CO_2$ laser to create a Laser-induced graphene (LIG) superhydrophobic surface 202 such that water droplets cannot spread and will roll off the surface. To improve the elastomeric nature and strength of the porous membrane housing the nanocrystals of the MOF in its pores, porous polyamide, porous PEBAX, porous nitrile rubber-based membranes, films, or the like, can be used. Polymers (such as polyamide, PEBAX, or the like) can be spontaneously wetted by polar aprotic solvents used for MOF synthesis.

Materials and Experimental Methods

Details of the materials and experimental methods in testing the protective material 100 are discussed below.

Membrane supports. Hydrophobic expanded polytetrafluoroethylene (ePTFE) membrane (GMM-404: pore size, 0.45 µm; porosity, 80%; thickness, 79 µm; large flat sheet provided by W. L. Gore, Elkton, MD) was used to support MOF nanocrystals. Asymmetric poly(ether sulfone) (PES) membrane (skin side pore size, 0.03 µm; diameter, 47 and 90 mm; thickness, 110-150 µm; provided by Sterlitech, Kent, WA) was employed as the support/substrate of laminated GO layers since its benzene rings can develop noncovalent π-π interactions with graphene. (See, e.g., Kuila, T. et al., *Facile method for the preparation of water dispersible graphene using sulfonated poly (ether-ether-ketone) and its application as energy storage materials*, Langmuir. 2012, 28, 9825-9833). In a few experiments, microporous polyetheretherketone (PEEK) membrane (200 nm pore size; diameter, 47 mm; thickness, 20-30 nm, provided by Sterlitech) was the used as the support.

Materials. The graphene oxide (GO) flake dimensions were 300-800 nm with a thickness of 0.7-1.2 nm. These single-layer GO flakes were made by modified Hummers' method and obtained from Cheap Tubes (Grafton, VT)., OH.

Chemicals. Dimethyl formamide (DMF) (Fisher Chemical, 99.9%), methanol (EMDMillipore, ≥99.8%), zirconium (IV) chloride (Alfa Aesar™,>99.5%), 2-aminoterephthalic acid ($H_2BDCNH_2$, Acros Organics™, 99%) were used for UiO-66-$NH_2$ MOF synthesis. Dimethyl methyl phosphonate (DMMP) (97%), ethylenediamine (EDA) (puriss. p.a., absolute, ≥99.5% (GC)), sodium dodecyl sulfate (SDS) (ACS reagent, ≥99.0%) were bought from Sigma-Aldrich. Polyurethane spray was obtained from Minwax® (Minwax® Fast-Drying Polyurethane Semi-Gloss Oil-Based Polyurethane: Minwax, Upper Saddle River, NJ). Gas cylinders of He, $N_2$, ethane, $CO_2$ were obtained from Airgas (Piscataway, NJ). CEES was obtained from Millipore Sigma (97%). O-pinacolyl methylphosphonofluoridate (i.e., Soman, GD, purity 95±1.5%) and bis(2-chloroethyl) sulfide (aka distilled mustard, HD, purity 98.7±0.2%) were obtained at CBC under the Chemical Agent Standard Analytical Reference Material (CASARM) quality assurance plan.

Preparation of GO flake-based membrane. Six steps were used in preparation of the GO flake-based membrane-GO suspension preparation, EDA addition, vacuum filtration, physical compression, heat treatment and polyurethane coating. (See, e.g., FIGS. 2A-2F). Membranes were prepared in two sizes based on the dimension of the PES support membrane, 47 mm and 90 mm. The amount of chemicals/materials used varied with the support membrane size. For a 90 mm membrane, 32 mg GO powder was added to 100 ml deionized (DI) water; 20 mg of SDS was added as dispersant. Ultrasonication was used until a clear dispersion was obtained. 10 ml of EDA was added to 100 ml cold deionized water, and then more cold water was added to lower the temperature of the solution. Two such EDA solution batches were prepared. The solution was maintained cold to prevent an observed increase in viscosity due to potential lowering of the critical micelle concentration of SDS and the corresponding micellization in the presence of amines. The diamine solution was slowly mixed with the GO dispersion with stirring. For a 47 mm support membrane, the values of the corresponding quantities were: 8 mg GO powder, 16 mg SDS, 100 ml DI water, 6 ml of EDA.

Next, the substrate polyethersulfone membrane was placed on the vacuum filter holder (47 mm: 80068-654, Fritted Support Assembly, VWR, PA; 90 mm: Z290424, Sigma-Aldrich® vacuum filtration assembly) and fixed. Next, suction filtration was carried out to remove all of the water and SDS (wash several times with the second EDA solution with the same concentration in case EDA might be washed away during this process, until no foam could be observed in the exhaust pipe). This process took about 2-3 days. Next, the membrane was taken out and slowly dried in an oven in $N_2$ atmosphere at 40° C. The membrane was subjected next to physical compression using a tableting machine (Model 3853-0, Carver Inc., Wabash, IN) for 2 min. The membrane was placed back into the oven in $N_2$ atmosphere at 80° C. for an hour to create crosslinking with the amine between various functional groups sticking out of the edges of GO flakes. At the end, a 2 μm thick polyurethane (PU) coating on top of the GO membrane was developed via spray coating. An hour gap was provided after coating each time with a total of three coats. Next, the membrane was dried slowly for 48 h before testing. Such membranes were designated PES-EDA-GO-PU. The PU coated side faced the feed gas/vapor during experimental permeation studies. The PU coating is sometimes useful but not essential, and is therefore optional.

MOF Synthesis in ePTFE membrane via infiltration with pressure assistance. Solvothermal synthesis of the MOF, UiO-66-NH$_2$, employed the reaction of 40 mmol 2-aminoterephthalic acid in 80 g DMF with 40 mmol ZrCl$_4$ in 20 g methanol as the appropriate solvent mixture and incorporated in membrane pores. The multistep process resulting in the MOF-filled membrane is illustrated in FIG. 9. Sodium dodecyl sulfate (SDS) powder was added to make the mixed solution containing 5 mM SDS. The mixed reactants solution was stirred with a magnetic stirrer for 15 min and sonicated for 15 min by an ultrasonic processor (operating at an amplitude of 80% and pulsed mode: 15 s "on" and 5 s "off"; Model #: EW-04714, Cole Parmer, Vernon Hills, IL). The membrane infiltration method can be implemented vis-à-vis pressure assistance in two ways: by pulling a vacuum or by applying pressurized solution over the porous membrane. The vacuum-assisted method is discussed herein due to the larger size of the samples needed as shown in FIG. 9, a photo of which is shown in FIG. 10.

Virgin microporous hydrophobic ePTFE membrane (GMM404, W. L. Gore) placed in the filtration cell was wetted by pure methanol first. The mixed reactant-containing solution (40 mmol 2-aminoterephthalic acid and 40 mmol ZrCl$_4$ dissolved in 100 g DMF-methanol mixture (80% DMF, w/w)) (which was also a 5 mM solution of SDS) was introduced into the pores of ePTFE membrane via negative pressure (about −10 psig) by pulling a vacuum, as shown in FIG. 10. The membrane and the remaining solution were transferred into a Teflon-lined sealed vessel. The vessel was put into an oven at 120° C. for 18 hr. After the reaction was over, the membrane was washed with methanol, dried at 50° C. for 4 days under vacuum, and weighed to determine the amount of MOF in the membrane. Often the membrane went through 2-3 cycles to enhance the amount of crystals in membrane pores. For such a case, the MOF-filled membrane from the first synthesis cycle was put into freshly prepared mixed reactant-containing solution (40 mmol 2-aminoterephthalic acid and 40 mmol ZrCl$_4$ dissolved in 100 g DMF-methanol mixture (80% DMF, w/w)). The same thermal synthesis process was followed after fully soaking. A digital orbital shaker (Model SK-O180-Pro, SCILOGEX) was used during the soaking process. One more repeat cycle was applied in the preparation for an even higher MOF loading of the MOF-filled membrane. Then, the membrane was washed with methanol, dried at 50° C. for 4 days under vacuum, and weighed to determine the amount of MOF in the membrane. During each solvothermal synthesis step, MOF crystals were synthesized outside the membrane in the solution containing the reactants. Such MOF crystals were also characterized.

Characterization of various membranes. Powder X-ray diffraction (PXRD) patterns of the MOF in the membrane pores and the GO membrane were obtained in an Empyrean multipurpose powder X-ray diffractometer with PIXcel1D detector (serial no. 202627, PANalytical). PXRD patterns of all MOF samples were scanned by Cu K(alpha) radiation (λ=1.54 Å, 40 mA, 45 kV) from 2° to 60° of 2θ, step size=0.0260° (2θ), scan step time=99.176 s. The corresponding details for the GO membrane are: 5 to 60° of 2θ, step size=0.0260° (2θ) to provide guidance on different values of the interlayer gaps. A closed sample box was used to store samples prior to testing. An Agilent Cary 670 (Agilent, Santa Clara, CA) Fourier-transform infrared spectrometer (FTIR) was employed for FTIR spectra of samples of both the GO and MOF samples; 32 scans were taken for each sample over 6000-400 cm$^{-1}$ with a resolution of 4 cm$^{-1}$. Membrane cross-sectional images were obtained by Scanning electron microscopy (SEM) in a field emission-scanning electron microscopes (FE-SEM, Model JSM-7900F; JEOL USA, Peabody, MA). The samples were mounted on the SEM stubs by carbon tape and coated with 8 nm of gold by Turbomolecular pumped coater (Model EMS Q150T ES).

An automated gas sorption analyzer (Model #: ASIQM000000-6, Quantachrome Instruments, Boynton Beach, FL) was employed to collect N$_2$ isotherm curves of samples. Commercial DFT software combined with the instrument operation interface was used to calculate pore size distribution and Brunauer-Emmett-Teller (BET) surface area. Before starting BET measurement, membrane samples were degassed at 70° C. for 48 hr. and UiO-66-NH$_2$ MOF samples were degassed at 120° C. for 18 hr.

Vapor permeance measurement by Upright Cup Method. This method used a cup-like test cell for holding a volatile sample liquid (FIGS. 3A-3B). The cup was filled with a liquid to be tested (e.g., water, DMMP) and covered with the multilayer membrane barrier to be tested. The GO side of the membrane faced the test liquid; the back side of the MOF filled membrane was exposed to the environment of a desiccator in which the assembled test cell was located. For water as the test liquid, the relative humidity in the cell was very high (about 90% RH) and water vapor (for example) migrated across the membrane into the very dry permeate side (about 1-5% RH) in the desiccator. The experiment was carried out under such a condition for 7 or more days; the weight loss of the entire setup was measured once every day over the whole week. The test cell cup was made of PVC (the membrane area in the cell was $2.85\times10^{-4}$ m$^2$). In some experiments, to avoid sorption of the chemical by the PVC material, a thin metallic foil was used to shield the polymer material forming the cup. The membrane area in the cell for these experiments was smaller, $1.77\times10^{-4}$ m$^2$; temperature was 25° C.

Water vapor permeance measurement in DMPC. The diameter of the circular composite membrane in the dynamic moisture permeation cell (DMPC) was 47 mm. (See, e.g., Gibson, P. W. et al., *An automated dynamic water vapor permeation test method*, Performance of Protective Clothing. ASTM International. 1997, 6). The effective membrane area in the cell was $7.07\times10^{-4}$ m$^2$. Temperature was 25° C. The relative humidity (RH) in the feed side of the cell was very high (about 90% RH). Water vapor migrated across membrane into the dry permeate side (about 1-5% RH). Relative humidities of both streams were measured by four RH transducers (HMP76, Vaisala, Woburn, MA). The pressure difference maintained between the two inlet locations (feed inlet and sweep inlet) was less than about 0.1 inch of water during moisture permeation measurement. Certain flow rates of gases were employed both in the feed side (pure $N_2$) and sweep side (pure He). To determine the permeance of moisture and $N_2$, the gas flow rates on both sides were maintained at the same value. These values were 20, 50, 100, 200 and 500 $cm^3$/min. The pressures were essentially atmospheric. A gas chromatograph (GC) (GC-2014, SHIMADZU) was used with a thermal conductivity detector (TCD); the column used for $N_2$ was Fused Silica Capillary Column (30 m×0.53 mm; Supelco Analytical). The conditions used were carrier gas temperature, 200° C.; column temperature, 180° C.; and detector temperature 230° C.

Figure 14:
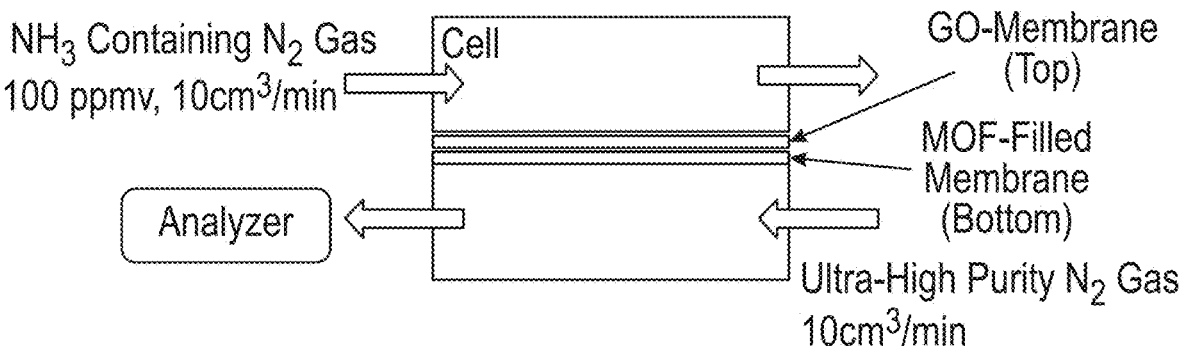
FIG. 14 is a diagrammatic view of ammonia breakthrough testing using DMPC.

Experiments for ammonia breakthrough studies. A dry nitrogen gas stream containing 100 ppmv $NH_3$ was introduced to the feed side of the DMPC at 10 $cm^3$/min flow rate from a gas cylinder having the $N_2$ calibration gas mixture (Gasco, Oldsmar, FL). On the other side of the cell, ultra-high purity $N_2$ gas (UHP NI 300, Airgas, Oakland, NJ) was introduced at the same flow rate (see, e.g., diagrammatic view of ammonia breakthrough testing illustrated in FIG. 14). The low level of ammonia in the counter-currently flowing stream was analyzed by a CMS analyzer (Draeger, Telford, PA) with ammonia CMS chips (0.2-5 ppm, Model 6406550, 2-50 ppm, Model 6406130, 10-150 ppm, Model 6406020, Draeger, Telford, PA).

Figure 15:
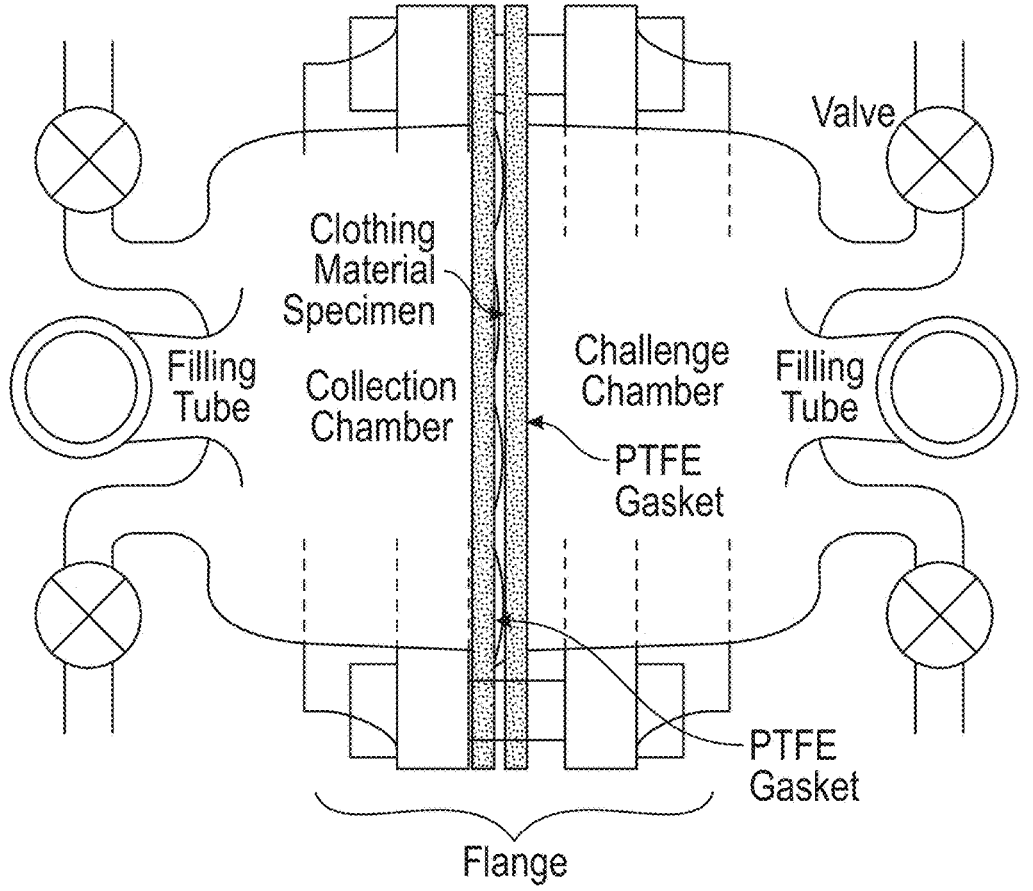
FIG. 15 is a diagrammatic view of a Pesce PTF 700 permeation cell for ASTM F 739-12.

Testing of breakthrough of CWAs. The testing of CWAs, HD, and GD, was carried out according to ASTM F 739-12. A schematic of the 1inch diameter Pesce PTF 700 permeation test cell used is shown in FIG. 15. A sample membrane was cut out to the required dimension of the cell. The permeation area was 5.02 $cm^2$. Dry air was introduced to both sides of the cell in a countercurrent fashion at 300 $cm^3$/min. Into the air entering the challenge side of the cell, the CWA or its simulant was introduced from a saturator cell at a rate sufficient to develop a concentration of 300 $mg/m^3$ concentration. When the CWA/simulant breaks through completely at its feed concentration level through the membrane into the collection chamber, the concentration level measured from the air stream exiting the collection chamber was considerably lower due to dilution.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A protective material, comprising:
a first layer including a microporous membrane supporting a cross-linked graphene oxide laminate membrane; and
a second layer positioned adjacent to the first layer, the second layer including a porous membrane defining pores, wherein the pores of the porous membrane are filled with nanocrystals of metal organic frameworks.

2. The protective material of claim 1, wherein the first layer and the second layer are secured or bonded to each other along an entire overlapping surface area of the respective first and second layers.

3. The protective material of claim 1, wherein the first and second layers are flexible.

4. The protective material of claim 1, wherein the first layer is configured as an outermost layer of the protective material and is intended to face a feed gas before the second layer faces the feed gas.

5. The protective material of claim 1, wherein the first layer blocks chemical warfare agents for a first period of time, and during a second period of time immediately beyond the first period of time, the first layer allows permeation of chemical warfare agents through the first layer and to the second layer at a chemical warfare agent level that is reduced by a factor of at least 94.7% relative to the chemical warfare agent level blocked by the first layer in the first period of time.

6. The protective material of claim 5, wherein the second layer at least one of absorbs or adsorbs the permeated chemical warfare agents for the second period of time.

7. The protective material of claim 1, wherein the first layer is impermeable to small gases at zero relative humidity and allows water vapor to pass therethrough.

8. The protective material of claim 1, wherein the material of the first layer comprises compressed graphene oxide, wherein contiguous layers are crosslinked.

9. The protective material of claim 1, wherein the microporous membrane of the first layer is fabricated from polyethersulfone, polyetheretherketone, polyurethane, crosslinked polyvinyl alcohol, polyether block amide, or surface-treated polyamide.

10. The protective material of claim 1, wherein the metal organic frameworks of the second layer are sorptive or reactive nanostructured UiO-66-$NH_2$.

11. The protective material of claim 1, wherein the microporous membrane is bonded to the cross-linked graphene oxide laminate membrane by glutaraldehyde-based or amine-based crosslinking.

12. The protective material of claim 1, wherein the first and second layers allow transmission of moisture therethrough at a rate of at least 1,500 $g/m^2$ per day at 30° C. and a relative humidity difference of 50%.

13. The protective material of claim 1, wherein a combination of the first and second layers is configured to completely block ammonia for about 2,750 minutes.

14. The protective material of claim 1, wherein a combination of the first and second layers is configured to completely block sulfur mustard gas for about 1,075 minutes.

15. The protective material of claim 1, wherein a combination of the first and second layers is configured to completely block Soman gas and a nerve simulant for about 176 minutes.

16. The protective material of claim 1, wherein a combination of the first and second layers is configured to completely block dimethyl methyl phosphonate for about 7 days.

17. The protective material of claim 1, wherein the microporous membrane of the first layer is laser treated to include laser-induced graphene, and the first layer is configured as an outermost layer of the protective material such that the laser-induced graphene faces a feed gas before the second layer faces the feed gas.

18. A protective wear fabricated from the protective material of claim 1.

19. A protective packaging for one or more items fabricated from the protective material of claim 1.

20. A protective material, comprising:

a first layer including a microporous membrane support-
ing a MXene laminate; and a second layer positioned adjacent to the first layer, the
second layer including a porous membrane defining 5
pores, wherein the pores of the porous membrane are
filled with nanocrystals of metal organic frameworks.

\* \* \* \* \*